United States Patent
Vasquez et al.

(10) Patent No.: US 10,742,593 B1
(45) Date of Patent: Aug. 11, 2020

(54) HYBRID CONTENT REQUEST ROUTING SYSTEM

(71) Applicant: Amazon Technologies, Inc., Seattle, WA (US)

(72) Inventors: Jorge Vasquez, Mercer Island, WA (US); Mohanish Narayan, Mumbai (IN); Harvo Reyzell Jones, Gig Harbor, WA (US)

(73) Assignee: Amazon Technologies, Inc., Seattle, WA (US)

( * ) Notice: Subject to any disclaimer, the term of this patent is extended or adjusted under 35 U.S.C. 154(b) by 257 days.

(21) Appl. No.: 15/714,799

(22) Filed: Sep. 25, 2017

(51) Int. Cl.
*H04L 29/12* (2006.01)
*H04L 29/06* (2006.01)

(52) U.S. Cl.
CPC ...... *H04L 61/1511* (2013.01); *H04L 61/2007* (2013.01); *H04L 67/42* (2013.01)

(58) Field of Classification Search
CPC .................................................. H04L 61/1511
See application file for complete search history.

(56) References Cited

U.S. PATENT DOCUMENTS

| | | | | |
|---|---|---|---|---|
| 6,405,252 B1* | 6/2002 | Gupta | ..................... | H04L 12/14 370/229 |
| 6,694,358 B1* | 2/2004 | Swildens | ................ | H04L 12/14 370/229 |
| 7,925,713 B1* | 4/2011 | Day | ...................... | H04L 47/125 370/229 |
| 9,118,680 B1* | 8/2015 | Dunlap | ............... | H04L 67/1008 |
| 9,137,300 B1* | 9/2015 | Marshall | .............. | H04L 67/1002 |
| 9,137,301 B1* | 9/2015 | Dunlap | ................. | H04L 67/101 |
| 9,407,539 B1* | 8/2016 | Dickinson | ............. | H04L 45/306 |
| 2011/0082916 A1* | 4/2011 | Swanson | ............... | H04L 45/125 709/219 |
| 2014/0258523 A1* | 9/2014 | Kazerani | ................. | H04L 43/08 709/224 |

(Continued)

OTHER PUBLICATIONS

Office Action issued in connection with U.S. Appl. No. 12/059,997 dated Jun. 9, 2010.

(Continued)

*Primary Examiner* — Benjamin M Thieu
(74) *Attorney, Agent, or Firm* — Knobbe Martens Olson & Bear LLP

(57) ABSTRACT

A hybrid content request routing system is described herein. The hybrid content request routing system may use aspects of the anycast routing technique and aspects of the domain name server (DNS) resolver-based routing technique to identify the appropriate network address to provide to a user device in response to receiving a DNS query. For example, the hybrid content request routing system may include one or more points of presence (POPs), with some or all of the POPs forming one or more virtual POPs. Individual POPs may be assigned unique network addresses and POPs that form a virtual POP may be assigned the same anycast network address. The hybrid content request routing system can measure latencies from user devices to the individual POP network addresses and to the anycast network addresses and use the measured latencies to identify the network address that may result in the lowest latency.

20 Claims, 7 Drawing Sheets

(56) References Cited

U.S. PATENT DOCUMENTS

| | | | |
|---|---|---|---|
| 2015/0215388 A1* | 7/2015 | Kontothanassis ... | H04L 67/1002 709/226 |
| 2017/0099254 A1* | 4/2017 | Leach ............... | H04L 61/1511 |

OTHER PUBLICATIONS

Final Office Action issued in connection with U.S. Appl. No. 12/059,997 dated Jan. 7, 2011.
Notice of Allowance issued in connection with U.S. Appl. No. 12/059,997 dated Nov. 14, 2011.
Office Action issued in connection with U.S. Appl. No. 13/419,233 dated Jan. 9, 2014.
Final Office Action issued in connection with U.S. Appl. No. 13/419,233 dated Aug. 19, 2014.
Office Action issued in connection with U.S. Appl. No. 13/419,233 dated Jan. 2, 2015.
Final Office Action issued in connection with U.S. Appl. No. 13/419,233 dated Apr. 24, 2015.
Office Action issued in connection with U.S. Appl. No. 13/419,233 dated Aug. 28, 2015.
Final Office Action issued in connection with U.S. Appl. No. 13/419,233 dated Feb. 12, 2016.
Notice of Allowance issued in connection with U.S. Appl. No. 13/419,233 dated Jun. 22, 2016.
Office Action issued in connection with U.S. Appl. No. 12/060,013 dated Dec. 1, 2009.
Final Office Action issued in connection with U.S. Appl. No. 12/060,013 dated Aug. 23, 2010.
Notice of Allowance issued in connection with U.S. Appl. No. 12/060,013 dated Aug. 13, 2013.
Notice of Allowance issued in connection with U.S. Appl. No. 14/066,516 dated Aug. 25, 2014.
Office Action issued in connection with U.S. Appl. No. 14/548,221 dated Jun. 16, 2015.
Final Office Action issued in connection with U.S. Appl. No. 14/548,221 dated Nov. 23, 2015.
Notice of Allowance issued in connection with U.S. No. 14/548,221 dated Sep. 8, 2016.
Office Action issued in connection with U.S. Appl. No. 15/402,131 dated Sep. 20, 2017.
Final Office Action issued in connection with U.S. Appl. No. 15/402,131 dated Apr. 13, 2018.
Office Action issued in connection with U.S. Appl. No. 15/402,131 dated Sep. 17, 2018.
Final Office Action issued in connection with U.S. Appl. No. 15/402,131 dated Mar. 18, 2019.
Notice of Allowance issued in connection with U.S. Appl. No. 15/402,131 dated Aug. 8, 2019.
Office Action issued in connection with U.S. Appl. No. 12/060,015 dated Nov. 3, 2010.
Final Office Action issued in connection with U.S. Appl. No. 12/060,015 dated Mar. 31, 2011.
Office Action issued in connection with U.S. Appl. No. 12/060,015 dated Apr. 11, 2013.
Notice of Allowance issued in connection with U.S. Appl. No. 12/060,015 dated Aug. 9, 2013.
Office Action issued in connection with U.S. Appl. No. 14/078,274 dated May 5, 2015.
Notice of Allowance issued in connection with U.S. Appl. No. 14/078,274 dated Aug. 21, 2015.
Office Action issued in connection with U.S. Appl. No. 14/886,937 dated Sep. 29, 2016.
Final Office Action issued in connection with U.S. Appl. No. 14/886,937 dated Feb. 9, 2017.
Office Action issued in connection with U.S. Appl. No. 14/886,937 dated May 26, 2017.
Final Office Action issued in connection with U.S. Appl. No. 14/886,937 dated Sep. 15, 2017.
Office Action issued in connection with U.S. Appl. No. 14/886,937 dated Jan. 8, 2018.
Final Office Action issued in connection with U.S. Appl. No. 14/886,937 dated Jun. 20, 2018.
Notice of Allowance issued in connection with U.S. Appl. No. 14/886,937 dated Aug. 15, 2018.
Office Action issued in connection with U.S. Appl. No. 16/221,176 dated Jan. 6, 2020.
Office Action issued in connection with U.S. Appl. No. 12/060,143 dated Jun. 24, 2010.
Final Office Action issued in connection with U.S. Appl. No. 12/060,143 dated Feb. 4, 2011.
Office Action issued in connection with U.S. Appl. No. 12/060,143 dated Jul. 20, 2012.
Notice of Allowance issued in connection with U.S. Appl. No. 12/060,143 dated Jan. 25, 2013.
Office Action issued in connection with U.S. Appl. No. 14/693,819 dated Oct. 27, 2015.
Final Office Action issued in connection with U.S. Appl. No. 14/693,819 dated Feb. 16, 2016.
Office Action issued in connection with U.S. Appl. No. 14/693,819 dated Jun. 17, 2016.
Final Office Action issued in connection with U.S. Appl. No. 14/693,819 dated Nov. 4, 2016.
Office Action issued in connection with U.S. Appl. No. 14/693,819 dated May 11, 2017.
Notice of Allowance issued in connection with U.S. Appl. No. 14/693,819 dated Dec. 10, 2017.
Office Action issued in connection with U.S. Appl. No. 15/891,176 dated Jun. 15, 2018.
Final Office Action issued in connection with U.S. Appl. No. 15/891,176 dated Dec. 20, 2018.
Office Action issued in connection with U.S. Appl. No. 15/891,176 dated May 31, 2019.
Final Office Action issued in connection with U.S. Appl. No. 15/891,176 dated Sep. 19, 2019.
Notice of Allowance issued in connection with U.S. Appl. No. 15/891,176 dated Jan. 8, 2020.
Office Action issued in connection with U.S. Appl. No. 13/897,027 dated Aug. 20, 2014.
Notice of Allowance issued in connection with U.S. Appl. No. 13/897,027 dated Jan. 22, 2015.
Office Action issued in connection with U.S. Appl. No. 12/060,124 dated Jul. 12, 2010.
Notice of Allowance issued in connection with U.S. Appl. No. 12/060,124 dated Feb. 23, 2011.
Notice of Allowance issued in connection with U.S. Appl. No. 13/170,102 dated Aug. 8, 2011.
Office Action issued in connection with U.S. Appl. No. 13/296,189 dated Feb. 22, 2012.
Notice of Allowance issued in connection with U.S. Appl. No. 13/296,189 dated May 11, 2012.
Office Action issued in connection with U.S. Appl. No. 3/614,714 dated Nov. 27, 2012.
Notice of Allowance issued in connection with U.S. Appl. No. 13/614,714 dated Jan. 10, 2013.
Office Action issued in connection with U.S. Appl. No. 13/888,283 dated Mar. 18, 2014.
Office Action issued in connection with U.S. Appl. No. 13/888,283 dated Sep. 15, 2014.
Notice of Allowance issued in connection with U.S. Appl. No. 13/888,283 dated Dec. 17, 2014.
Office Action issued in connection with U.S. Appl. No. 14/639,933 dated Aug. 17, 2015.
Notice of Allowance issued in connection with U.S. Appl. No. 14/639,933 dated Jan. 14, 2016.
Office Action issued in connection with U.S. Appl. No. 15/139,239 dated Aug. 25, 2016.
Notice of Allowance issued in connection with U.S. Appl. No. 15/139,239 dated Dec. 12, 2016.
Office Action issued in connection with U.S. Appl. No. 15/483,659 dated Aug. 31, 2017.

(56) References Cited

OTHER PUBLICATIONS

Notice of Allowance issued in connection with U.S. Appl. No. 15/483,659 dated Oct. 17, 2017.
Office Action issued in connection with U.S. Appl. No. 15/891,995 dated May 9, 2018.
Notice of Allowance issued in connection with U.S. Appl. No. 15/891,995 dated Aug. 9, 2018.
Office Action issued in connection with U.S. Appl. No. 16/222,389 dated May 1, 2019.
Notice of Allowance issued in connection with U.S. Appl. No. 16/222,389 dated Aug. 28, 2019.
Office Action issued in connection with U.S. Appl. No. 12/060,173 dated Jul. 8, 2010.
Notice of Allowance issued in connection with U.S. Appl. No. 12/060,173 dated Feb. 1, 2011.
Office Action issued in connection with U.S. Appl. No. 13/098,366 dated Aug. 8, 2011.
Notice of Allowance issued in connection with U.S. Appl. No. 13/098,366 dated Nov. 7, 2011.
Office Action issued in connection with U.S. Appl. No. 13/418,239 dated Aug. 8, 2012.
Notice of Allowance issued in connection with U.S. Appl. No. 13/418,239 dated Oct. 16, 2012.
Office Action issued in connection with U.S. Appl. No. 13/766,574 dated Sep. 6, 2013.
Notice of Allowance issued in connection with U.S. Appl. No. 13/766,574 dated Dec. 23, 2013.
Office Action issued in connection with U.S. Appl. No. 14/263,824 dated Jul. 15, 2016.
Notice of Allowance issued in connection with U.S. Appl. No. 14/263,824 dated Oct. 18, 2016.
Office Action issued in connection with U.S. Appl. No. 15/408,362 dated May 8, 2017.
Notice of Allowance issued in connection with U.S. Appl. No. 15/408,362 dated Oct. 5, 2017.
Office Action issued in connection with U.S. Appl. No. 15/888,860 dated May 9, 2018.
Notice of Allowance issued in connection with U.S. Appl. No. 15/888,860 dated Aug. 10, 2018.
Office Action issued in connection with U.S. Appl. No. 16/405,779 dated Sep. 6, 2019.
Office Action issued in connection with U.S. Appl. No. 12/060,202 dated May 13, 2010.
Final Office Action issued in connection with U.S. Appl. No. 12/060,202 dated Nov. 9, 2010.
Office Action issued in connection with U.S. Appl. No. 12/060,202 dated Jan. 19, 2012.
Final Office Action issued in connection with U.S. Appl. No. 12/060,202 dated Jun. 28, 2012.
Notice of Allowance issued in connection with U.S. Appl. No. 12/060,202 dated Jun. 7, 2013.
Office Action issued in connection with U.S. Appl. No. 14/012,387 dated Jan. 5, 2015.
Final Office Action issued in connection with U.S. Appl. No. 14/012,387 dated Jun. 8, 2015.
Notice of Allowance issued in connection with U.S. Appl. No. 14/012,387 dated Aug. 14, 2015.
Office Action issued in connection with U.S. Appl. No. 14/961,343 dated Jul. 28, 2016.
Final Office Action issued in connection with U.S. Appl. No. 14/961,343 dated Jan. 19, 2017.
Office Action issued in connection with U.S. Appl. No. 14/961,343 dated Jun. 21, 2017.
Notice of Allowance issued in connection with U.S. Appl. No. 14/961,343 dated Oct. 10, 2017.
Office Action issued in connection with U.S. Appl. No. 12/060,213 dated Jun. 17, 2010.
Final Office Action issued in connection with U.S. Appl. No. 12/060,213 dated Nov. 10, 2010.
Office Action issued in connection with U.S. Appl. No. 12/060,213 dated Mar. 22, 2012.
Notice of Allowance issued in connection with U.S. Appl. No. 12/060,213 dated Jul. 20, 2012.
Notice of Allowance issued in connection with U.S. Appl. No. 13/720,955 dated Sep. 10, 2013.
Office Action issued in connection with U.S. Appl. No. 13/793,886 dated Nov. 7, 2013.
Notice of Allowance issued in connection with U.S. Appl. No. 13/793,886 dated Feb. 19, 2014.
Notice of Allowance issued in connection with U.S. Appl. No. 14/165,329 dated Apr. 11, 2016.
Office Action issued in connection with U.S. Appl. No. 13/621,084 dated May 30, 2014.
Final Office Action issued in connection with U.S. Appl. No. 13/621,084 dated Oct. 23, 2014.
Office Action issued in connection with U.S. Appl. No. 13/621,084 dated Feb. 11, 2015.
Final Office Action issued in connection with U.S. Appl. No. 13/621,084 dated Jun. 16, 2015.
Office Action issued in connection with U.S. Appl. No. 13/621,084 dated Nov. 6, 2015.
Final Office Action issued in connection with U.S. Appl. No. 13/621,084 dated Mar. 4, 2016.
Office Action issued in connection with U.S. Appl. No. 13/621,084 dated Sep. 21, 2016.
Final Office Action issued in connection with U.S. Appl. No. 13/621,084 dated Feb. 15, 2017.
Office Action issued in connection with U.S. Appl. No. 13/621,084 dated Jun. 22, 2017.
Final Office Action issued in connection with U.S. Appl. No. 13/621,084 dated Oct. 27, 2017.
Office Action issued in connection with U.S. Appl. No. 13/621,084 dated Apr. 4, 2018.
Final Office Action issued in connection with U.S. Appl. No. 13/621,084 dated Sep. 11, 2018.
Office Action issued in connection with U.S. Appl. No. 13/621,084 dated Mar. 19, 2019.
Final Office Action issued in connection with U.S. Appl. No. 13/621,084 dated Aug. 14, 2019.
Office Action issued in connection with U.S. Appl. No. 13/621,085 dated May 15, 2014.
Final Office Action issued in connection with U.S. Appl. No. 13/621,085 dated Oct. 23, 2014.
Office Action issued in connection with U.S. Appl. No. 13/621,085 dated Mar. 26, 2015.
Final Office Action issued in connection with U.S. Appl. No. 13/621,085 dated Jul. 10, 2015.
Office Action issued in connection with U.S. Appl. No. 13/621,085 dated Dec. 4, 2015.
Final Office Action issued in connection with U.S. Appl. No. 13/621,085 dated Apr. 4, 2016.
Office Action issued in connection with U.S. Appl. No. 13/621,085 dated Sep. 30, 2016.
Final Office Action issued in connection with U.S. Appl. No. 13/621,085 dated Feb. 28, 2017.
Office Action issued in connection with U.S. Appl. No. 13/621,085 dated Jul. 13, 2017.
Final Office Action issued in connection with U.S. Appl. No. 13/621,085 dated Jan. 19, 2018.
Office Action issued in connection with U.S. Appl. No. 13/621,085 dated Aug. 9, 2018.
Final Office Action issued in connection with U.S. Appl. No. 13/621,085 dated Jan. 18, 2019.
Notice of Allowance issued in connection with U.S. Appl. No. 13/621,085 dated Sep. 25, 2019.
Office Action issued in connection with U.S. Appl. No. 12/189,019 dated Jul. 30, 2010.
Office Action issued in connection with U.S. Appl. No. 12/189,019 dated Feb. 8, 2011.
Final Office Action issued in connection with U.S. Appl. No. 12/189,019 dated Aug. 19, 2011.

(56) References Cited

OTHER PUBLICATIONS

Notice of Allowance issued in connection with U.S. Appl. No. 12/189,019 dated Nov. 5, 2012.
Office Action issued in connection with U.S. Appl. No. 12/956,823 dated Aug. 5, 2011.
Final Office Action issued in connection with U.S. Appl. No. 12/956,823 dated Jan. 6, 2012.
Notice of Allowance issued in connection with U.S. Appl. No. 12/956,823 dated Sep. 18, 2012.
Office Action issued in connection with U.S. Appl. No. 12/956,647 dated Aug. 5, 2011.
Office Action issued in connection with U.S. Appl. No. 12/956,647 dated Jan. 13, 2012.
Notice of Allowance issued in connection with U.S. Appl. No. 12/956,647 dated Nov. 9, 2012.
Office Action issued in connection with U.S. Appl. No. 12/956,748 dated Jun. 23, 2011.
Final Office Action issued in connection with U.S. Appl. No. 12/956,748 dated Nov. 10, 2011.
Notice of Allowance issued in connection with U.S. Appl. No. 12/956,748 dated Nov. 6, 2012.
Office Action issued in connection with U.S. Appl. No. 12/596,566 dated Jul. 8, 2011.
Final Office Action issued in connection with U.S. Appl. No. 12/596,566 dated Jan. 5, 2012.
Notice of Allowance issued in connection with U.S. Appl. No. 12/596,566 dated Oct. 2, 2012.
Office Action issued in connection with U.S. Appl. No. 12/165,343 dated Mar. 22, 2010.
Notice of Allowance issued in connection with U.S. Appl. No. 12/165,343 dated Dec. 21, 2010.
Office Action issued in connection with U.S. Appl. No. 13/568,005 dated Nov. 5, 2012.
Notice of Allowance issued in connection with U.S. Appl. No. 13/568,005 dated Mar. 19, 2013.
Office Action issued in connection with U.S. Appl. No. 13/896,840 dated Sep. 23, 2014.
Notice of Allowance issued in connection with U.S. Appl. No. 13/896,840 dated Jan. 5, 2015.
Office Action issued in connection with U.S. Appl. No. 14/683,019 dated Aug. 11, 2015.
Final Office Action issued in connection with U.S. Appl. No. 14/683,019 dated Dec. 4, 2015.
Office Action issued in connection with U.S. Appl. No. 14/683,019 dated May 9, 2016.
Final Office Action issued in connection with U.S. Appl. No. 14/683,019 dated Sep. 15, 2016.
Notice of Allowance issued in connection with U.S. Appl. No. 14/683,019 dated Nov. 25, 2016.
Office Action issued in connection with U.S. Appl. No. 13/042,301 dated Aug. 24, 2011.
Notice of Allowance issued in connection with U.S. Appl. No. 13/042,301 dated Apr. 2, 2012.
Office Action issued in connection with U.S. Appl. No. 12/412,456 dated May 16, 2011.
Final Office Action issued in connection with U.S. Appl. No. 12/412,456 dated Mar. 12, 2012.
Notice of Allowance issued in connection with U.S. Appl. No. 12/412,456 dated Feb. 12, 2014.
Office Action issued in connection with U.S. Appl. No. 13/909,882 dated Aug. 21, 2014.
Final Office Action issued in connection with U.S. Appl. No. 13/909,882 dated Jan. 14, 2015.
Notice of Allowance issued in connection with U.S. Appl. No. 13/909,882 dated Mar. 24, 2015.
Office Action issued in connection with U.S. Appl. No. 14/010,438 dated Sep. 11, 2014.
Notice of Allowance issued in connection with U.S. Appl. No. 14/010,438 dated Dec. 11, 2014.
Office Action issued in connection with U.S. Appl. No. 14/297,558 dated Sep. 30, 2014.
Final Office Action issued in connection with U.S. Appl. No. 14/297,558 dated Apr. 7, 2015.
Notice of Allowance issued in connection with U.S. Appl. No. 14/297,558 dated Jul. 21, 2015.
Office Action issued in connection with U.S. Appl. No. 14/630,516 dated Nov. 3, 2016.
Office Action issued in connection with U.S. Appl. No. 14/630,516 dated May 8, 2017.
Final Office Action issued in connection with U.S. Appl. No. 14/630,516 dated Nov. 9, 2017.
Office Action issued in connection with U.S. Appl. No. 14/630,516 dated Apr. 5, 2018.
Notice of Allowance issued in connection with U.S. Appl. No. 14/630,516 dated Nov. 2, 2018.
Office Action issued in connection with U.S. Appl. No. 14/718,037 dated Oct. 26, 2016.
Office Action issued in connection with U.S. Appl. No. 14/718,037 dated May 5, 2017.
Final Office Action issued in connection with U.S. Appl. No. 14/718,037 dated Nov. 9, 2017.
Office Action issued in connection with U.S. Appl. No. 14/718,037 dated Mar. 28, 2018.
Office Action issued in connection with U.S. Appl. No. 14/718,037 dated Oct. 29, 2018.
Final Office Action issued in connection with U.S. Appl. No. 14/718,037 dated Apr. 25, 2019.
Notice of Allowance issued in connection with U.S. Appl. No. 14/718,037 dated Oct. 17, 2019.
Office Action issued in connection with U.S. Appl. No. 14/935,228 dated Mar. 8, 2018.
Final Office Action issued in connection with U.S. Appl. No. 14/935,228 dated Sep. 12, 2018.
Notice of Allowance issued in connection with U.S. Appl. No. 14/935,228 dated Dec. 11, 2018.
Office Action issued in connection with U.S. Appl. No. 12/412,467 dated May 22, 2013.
Notice of Allowance issued in connection with U.S. Appl. No. 12/412,467 dated Nov. 8, 2013.
Office Action issued in connection with U.S. Appl. No. 13/621,062 dated Dec. 5, 2012.
Notice of Allowance issued in connection with U.S. Appl. No. 13/621,062 dated Feb. 22, 2013.
Office Action issued in connection with U.S. Appl. No. 13/621,066 dated Feb. 14, 2013.
Notice of Allowance issued in connection with U.S. Appl. No. 13/621,066 dated May 8, 2013.
Office Action issued in connection with U.S. Appl. No. 12/485,783 dated Aug. 30, 2012.
Office Action issued in connection with U.S. Appl. No. 12/485,783 dated Mar. 26, 2013.
Final Office Action issued in connection with U.S. Appl. No. 12/485,783 dated Oct. 7, 2013.
Notice of Allowance issued in connection with U.S. Appl. No. 12/485,783 dated Mar. 31, 2014.
Office Action issued in connection with U.S. Appl. No. 14/331,067 dated Nov. 26, 2014.
Final Office Action issued in connection with U.S. Appl. No. 14/331,067 dated Apr. 27, 2015.
Notice of Allowance issued in connection with U.S. Appl. No. 14/331,067 dated Jul. 7, 2015.
Office Action issued in connection with U.S. Appl. No. 14/871,872 dated Apr. 11, 2016.
Final Office Action issued in connection with U.S. Appl. No. 14/871,872 dated Oct. 17, 2016.
Office Action issued in connection with U.S. Appl. No. 14/871,872 dated Feb. 10, 2017.
Final Office Action issued in connection with U.S. Appl. No. 14/871,872 dated Aug. 8, 2017.
Office Action issued in connection with U.S. Appl. No. 14/871,872 dated Feb. 7, 2018.

(56) References Cited

OTHER PUBLICATIONS

Notice of Allowance issued in connection with U.S. Appl. No. 14/871,872 dated Aug. 15, 2018.
Office Action issued in connection with U.S. Appl. No. 14/297,558 dated Jan. 3, 2019.
Notice of Allowance issued in connection with U.S. Appl. No. 14/297,558 dated May 8, 2019.
Office Action issued in connection with U.S. Appl. No. 13/620,868 dated Nov. 23, 2012.
Notice of Allowance issued in connection with U.S. Appl. No. 13/620,868 dated Apr. 15, 2013.
Office Action issued in connection with U.S. Appl. No. 12/412,431 dated Mar. 8, 2012.
Office Action issued in connection with U.S. Appl. No. 12/412,431 dated Nov. 23, 2012.
Notice of Allowance issued in connection with U.S. Appl. No. 12,412,431 dated May 10, 2013.
Office Action issued in connection with U.S. Appl. No. 13/973,883 dated Oct. 23, 2015.
Final Office Action issued in connection with U.S. Appl. No. 13/973,883 dated May 5, 2016.
Office Action issued in connection with U.S. Appl. No. 13/973,883 dated Sep. 30, 2016.
Final Office Action issued in connection with U.S. Appl. No. 13/973,883 dated Apr. 18, 2017.
Notice of Allowance issued in connection with U.S. Appl. No. 13/973,883 dated Nov. 20, 2019.
Office Action issued in connection with U.S. Appl. No. 12/272,681 dated Nov. 26, 2010.
Final Office Action issued in connection with U.S. Appl. No. 12/272,681 dated Apr. 27, 2011.
Office Action issued in connection with U.S. Appl. No. 12/272,681 dated Oct. 11, 2012.
Notice of Allowance issued in connection with U.S. Appl. No. 12/272,681 dated Apr. 18, 2013.
Office Action issued in connection with U.S. Appl. No. 14/010,461 dated May 2, 2014.
Final Office Action issued in connection with U.S. Appl. No. 14/010,461 dated Oct. 9, 2014.
Office Action issued in connection with U.S. Appl. No. 14/010,461 dated Jan. 15, 2015.
Final Office Action issued in connection with U.S. Appl. No. 14/010,461 dated Jul. 9, 2015.
Notice of Allowance issued in connection with U.S. Appl. No. 14/010,461 dated Oct. 7, 2015.
Office Action issued in connection with U.S. Appl. No. 15/003,699 dated Jul. 8, 2016.
Notice of Allowance issued in connection with U.S. Appl. No. 15/003,699 dated Nov. 4, 2016.
Office Action issued in connection with U.S. Appl. No. 12/272,666 dated Feb. 23, 2011.
Notice of Allowance issued in connection with U.S. Appl. No. 12/272,666 dated Aug. 25, 2011.
Office Action issued in connection with U.S. Appl. No. 13/296,156 dated May 15, 2012.
Notice of Allowance issued in connection with U.S. Appl. No. 13/296,156 dated Jun. 8, 2012.
Office Action issued in connection with U.S. Appl. No. 13/620,945 dated Dec. 13, 2012.
Notice of Allowance issued in connection with U.S. Appl. No. 13/620,945 dated May 1, 2013.
Office Action issued in connection with U.S. Appl. No. 13/948,087 dated Feb. 10, 2016.
Office Action issued in connection with U.S. Appl. No. 12/412,443 dated Mar. 15, 2012.
Notice of Allowance issued in connection with U.S. Appl. No. 12/412,443 dated Nov. 27, 2012.
Office Action issued in connection with U.S. Appl. No. 13/829,586 dated May 28, 2015.
Notice of Allowance issued in connection with U.S. Appl. No. 13/829,586 dated Sep. 15, 2015.
Office Action issued in connection with U.S. Appl. No. 14/942,728 dated Feb. 28, 2017.
Final Office Action issued in connection with U.S. Appl. No. 14/942,728 dated Aug. 15, 2017.
Office Action issued in connection with U.S. Appl. No. 14/942,728 dated Dec. 29, 2017.
Final Office Action issued in connection with U.S. Appl. No. 14/942,728 dated Jul. 27, 2018.
Office Action issued in connection with U.S. Appl. No. 14/942,728 dated Mar. 1, 2019.
Notice of Allowance issued in connection with U.S. Appl. No. 14/942,728 dated Jul. 31, 2019.
Office Action issued in connection with U.S. Appl. No. 12/272,687 dated Sep. 9, 2010.
Office Action issued in connection with U.S. Appl. No. 12/272,687 dated Feb. 3, 2011.
Notice of Allowance issued in connection with U.S. Appl. No. 12/272,687 dated May 27, 2011.
Notice of Allowance issued in connection with U.S. Appl. No. 12/272,687 dated Aug. 17, 2012.
Office Action issued in connection with U.S. Appl. No. 14/886,937 dated Nov. 9, 2012.
Final Office Action issued in connection with U.S. Appl. No. 14/886,937 dated Jan. 10, 2013.
Notice of Allowance issued in connection with U.S. Appl. No. 14/886,937 dated Mar. 21, 2013.
Office Action issued in connection with U.S. Appl. No. 13/908,830 dated Sep. 23, 2014.
Notice of Allowance issued in connection with U.S. Appl. No. 13/908,830 dated Dec. 15, 2014.
Office Action issued in connection with U.S. Appl. No. 14/631,556 dated Aug. 23, 2016.
Final Office Action issued in connection with U.S. Appl. No. 14/631,556 dated Jan. 26, 2017.
Office Action issued in connection with U.S. Appl. No. 14/631,556 dated May 26, 2017.
Final Office Action issued in connection with U.S. Appl. No. 14/631,556 dated Dec. 21, 2017.
Notice of Allowance issued in connection with U.S. Appl. No. 14/631,556 dated Feb. 22, 2018.
Office Action issued in connection with U.S. Appl. No. 15/993,109 dated Jun. 26, 2019.
Notice of Allowance issued in connection with U.S. Appl. No. 15/993,109 dated Aug. 19, 2019.
Office Action issued in connection with U.S. Appl. No. 12/272,655 dated Mar. 4, 2011.
Final Office Action issued in connection with U.S. Appl. No. 12/272,655 dated Oct. 28, 2011.
Notice of Allowance issued in connection with U.S. Appl. No. 12/272,655 dated Jan. 16, 2014.
Office Action issued in connection with U.S. Appl. No. 14/281,165 dated Aug. 5, 2015.
Final Office Action issued in connection with U.S. Appl. No. 14/281,165 dated Feb. 16, 2016.
Office Action issued in connection with U.S. Appl. No. 14/281,165 dated Jun. 23, 2016.
Final Office Action issued in connection with U.S. Appl. No. 14/281,165 dated Dec. 30, 2016.
Notice of Allowance issued in connection with U.S. Appl. No. 14/281,165 dated Apr. 24, 2017.
Office Action issued in connection with U.S. Appl. No. 12/272,699 dated Dec. 14, 2010.
Notice of Allowance issued in connection with U.S. Appl. No. 12/272,699 dated Jul. 25, 2011.
Office Action issued in connection with U.S. Appl. No. 13/299,169 dated Feb. 3, 2012.
Notice of Allowance issued in connection with U.S. Appl. No. 13/299,169 dated Mar. 27, 2012.
Office Action issued in connection with U.S. Appl. No. 13/567,429 dated Nov. 16, 2012.

(56) References Cited

OTHER PUBLICATIONS

Notice of Allowance issued in connection with U.S. Appl. No. 13/567,429 dated Jul. 25, 2013.
Office Action issued in connection with U.S. Appl. No. 14/062,614 dated Jul. 6, 2015.
Final Office Action issued in connection with U.S. Appl. No. 14/062,614 dated Jan. 6, 2016.
Office Action issued in connection with U.S. Appl. No. 14/062,614 dated Apr. 22, 2016.
Notice of Allowance issued in connection with U.S. Appl. No. 14/062,614 dated Aug. 16, 2016.
Office Action issued in connection with U.S. Appl. No. 15/369,758 dated Feb. 28, 2017.
Notice of Allowance issued in connection with U.S. Appl. No. 15/369,758 dated Jun. 5, 2017.
Office Action issued in connection with U.S. Appl. No. 15/682,383 dated Mar. 9, 2018.
Notice of Allowance issued in connection with U.S. Appl. No. 15/682,383 dated Jul. 17, 2018.
Office Action issued in connection with U.S. Appl. No. 12/272,683 dated Sep. 9, 2010.
Final Office Action issued in connection with U.S. Appl. No. 12/272,683 dated Jan. 14, 2011.
Notice of Allowance issued in connection with U.S. Appl. No. 12/272,683 dated Mar. 18, 2011.
Notice of Allowance issued in connection with U.S. Appl. No. 13/165,484 dated Mar. 22, 2012.
Office Action issued in connection with U.S. Appl. No. 13/529,831 dated Oct. 4, 2012.
Notice of Allowance issued in connection with U.S. Appl. No. 13/529,831 dated Dec. 13, 2012.
Office Action issued in connection with U.S. Appl. No. 13/829,518 dated Sep. 19, 2014.
Notice of Allowance issued in connection with U.S. Appl. No. 13/829,518 dated Jan. 15, 2015.
Office Action issued in connection with U.S. Appl. No. 14/673,743 dated Aug. 23, 2016.
Final Office Action issued in connection with U.S. Appl. No. 14/673,743 dated Jan. 5, 2017.
Office Action issued in connection with U.S. Appl. No. 14/673,743 dated May 5, 2017.
Final Office Action issued in connection with U.S. Appl. No. 14/673,743 dated Nov. 9, 2017.
Notice of Allowance issued in connection with U.S. Appl. No. 14/673,743 dated Mar. 27, 2018.
Office Action issued in connection with U.S. Appl. No. 16/018,507 dated Nov. 19, 2019.
Office Action issued in connection with U.S. Appl. No. 12/272,715 dated Jan. 24, 2011.
Final Office Action issued in connection with U.S. Appl. No. 12/272,715 dated Jun. 28, 2011.
Notice of Allowance issued in connection with U.S. Appl. No. 12/272,715 dated Oct. 21, 2011.
Office Action issued in connection with U.S. Appl. No. 13/358,478 dated Apr. 26, 2012.
Final Office Action issued in connection with U.S. Appl. No. 13/358,478 dated Oct. 12, 2012.
Office Action issued in connection with U.S. Appl. No. 13/358,478 dated Mar. 28, 2013.
Final Office Action issued in connection with U.S. Appl. No. 13/358,478 dated Sep. 11, 2013.
Notice of Allowance issued in connection with U.S. Appl. No. 13/358,478 dated Apr. 2, 2014.
Office Action issued in connection with U.S. Appl. No. 14/337,021 dated Jun. 30, 2016.
Final Office Action issued in connection with U.S. Appl. No. 14/337,021 dated Jan. 6, 2017.
Notice of Allowance issued in connection with U.S. Appl. No. 14/337,021 dated Jan. 16, 2018.
Office Action issued in connection with U.S. Appl. No. 15/923,732 dated Oct. 3, 2018.
Final Office Action issued in connection with U.S. Appl. No. 15/923,732 dated May 1, 2019.
Office Action issued in connection with U.S. Appl. No. 15/923,732 dated Sep. 6, 2019.
Office Action issued in connection with U.S. Appl. No. 12/272,641 dated Feb. 23, 2011.
Notice of Allowance issued in connection with U.S. Appl. No. 12/272,641 dated Aug. 25, 2011.
Office Action issued in connection with U.S. Appl. No. 13/299,229 dated May 7, 2012.
Office Action issued in connection with U.S. Appl. No. 13/299,229 dated May 16, 2012.
Notice of Allowance issued in connection with U.S. Appl. No. 13/299,229 dated Jun. 6, 2012.
Office Action issued in connection with U.S. Appl. No. 13/614,971 dated Dec. 13, 2012.
Notice of Allowance issued in connection with U.S. Appl. No. 13/614,971 dated May 31, 2013.
Office Action issued in connection with U.S. Appl. No. 13/964,973 dated Feb. 11, 2016.
Notice of Allowance issued in connection with U.S. Appl. No. 13/964,973 dated May 19, 2016.
Office Action issued in connection with U.S. Appl. No. 12/722,454 dated May 31, 2012.
Notice of Allowance issued in connection with U.S. Appl. No. 12/722,454 dated Nov. 26, 2012.
Notice of Allowance issued in connection with U.S. Appl. No. 13/794,415 dated Apr. 14, 2015.
Office Action issued in connection with U.S. Appl. No. 14/800,591 dated Oct. 6, 2016.
Notice of Allowance issued in connection with U.S. Appl. No. 14/800,591 dated Mar. 24, 2017.
Notice of Allowance issued in connection with U.S. Appl. No. 15/597,841 dated Jul. 16, 2018.
Office Action issued in connection with U.S. Appl. No. 16/195,628 dated Dec. 31, 2019.
Office Action issued in connection with U.S. Appl. No. 12/892,777 dated Mar. 22, 2013.
Final Office Action issued in connection with U.S. Appl. No. 12/892,777 dated Jan. 30, 2014.
Office Action issued in connection with U.S. Appl. No. 12/892,777 dated Mar. 25, 2015.
Final Office Action issued in connection with U.S. Appl. No. 12/892,777 dated Oct. 5, 2015.
Office Action issued in connection with U.S. Appl. No. 12/892,777 dated Apr. 6, 2016.
Final Office Action issued in connection with U.S. Appl. No. 12/892,777 dated Oct. 4, 2016.
Notice of Allowance issued in connection with U.S. Appl. No. 12/892,777 dated Mar. 27, 2017.
Office Action issued in connection with U.S. Appl. No. 15/604,451 dated Oct. 5, 2017.
Final Office Action issued in connection with U.S. Appl. No. 15/604,451 dated May 17, 2018.
Office Action issued in connection with U.S. Appl. No. 15/604,451 dated Jan. 22, 2019.
Final Office Action issued in connection with U.S. Appl. No. 15/604,451 dated Sep. 19, 2019.
Office Action issued in connection with U.S. Appl. No. 12/892,794 dated Jul. 23, 2012.
Final Office Action issued in connection with U.S. Appl. No. 12/892,764 dated Feb. 15, 2013.
Office Action issued in connection with U.S. Appl. No. 12/892,794 dated Jul. 24, 2014.
Final Office Action issued in connection with U.S. Appl. No. 12/892,794 dated Feb. 13, 2015.
Office Action issued in connection with U.S. Appl. No. 12/892,794 dated Sep. 18, 2015.
Final Office Action issued in connection with U.S. Appl. No. 12/892,794 dated Mar. 24, 2016.

(56) References Cited

OTHER PUBLICATIONS

Office Action issued in connection with U.S. Appl. No. 12/892,794 dated Jan. 12, 2017.
Final Office Action issued in connection with U.S. Appl. No. 12/892,794 dated May 5, 2017.
Office Action issued in connection with U.S. Appl. No. 12/892,794 dated Oct. 5, 2017.
Final Office Action issued in connection with U.S. Appl. No. 12/892,794 dated May 18, 2018.
Office Action issued in connection with U.S. Appl. No. 12/892,794 dated Oct. 4, 2018.
Final Office Action issued in connection with U.S. Appl. No. 12/892,794 dated May 30, 2019.
Office Action issued in connection with U.S. Appl. No. 12/892,822 dated Oct. 11, 2012.
Notice of Allowance issued in connection with U.S. Appl. No. 12/892,822 dated Mar. 4, 2013.
Office Action issued in connection with U.S. Appl. No. 13/919,912 dated Feb. 20, 2015.
Final Office Action issued in connection with U.S. Appl. No. 13/919,912 dated Jul. 22, 2015.
Office Action issued in connection with U.S. Appl. No. 13/919,912 dated Apr. 29, 2016.
Final Office Action issued in connection with U.S. Appl. No. 13/919,912 dated Sep. 29, 2016.
Office Action issued in connection with U.S. Appl. No. 13/919,912 dated Jan. 13, 2017.
Final Office Action issued in connection with U.S. Appl. No. 13/919,912 dated May 8, 2017.
Office Action issued in connection with U.S. Appl. No. 13/919,912 dated Aug. 30, 2017.
Final Office Action issued in connection with U.S. Appl. No. 13/919,912 dated Feb. 2, 2018.
Office Action issued in connection with U.S. Appl. No. 13/919,912 dated Jun. 1, 2018.
Notice of Allowance issued in connection with U.S. Appl. No. 13/919,912 dated Oct. 30, 2018.
Office Action issued in connection with U.S. Appl. No. 16/243,977 dated Sep. 20, 2019.
Office Action issued in connection with U.S. Appl. No. 13/620,976 dated Jan. 10, 2013.
Final Office Action issued in connection with U.S. Appl. No. 13/620,976 dated Aug. 13, 2013.
Notice of Allowance issued in connection with U.S. Appl. No. 13/620,976 dated Nov. 6, 2013.
Office Action issued in connection with U.S. Appl. No. 12/892,818 dated Oct. 22, 2012.
Final Office Action issued in connection with U.S. Appl. No. 12/892,818 dated Feb. 13, 2013.
Office Action issued in connection with U.S. Appl. No. 12/892,818 dated Apr. 11, 2014.
Final Office Action issued in connection with U.S. Appl. No. 12/892,818 dated Oct. 10, 2014.
Notice of Allowance issued in connection with U.S. Appl. No. 12/892,818 dated Dec. 19, 2014.
Office Action issued in connection with U.S. Appl. No. 14/629,411 dated Sep. 1, 2015.
Final Office Action issued in connection with U.S. Appl. No. 14/629,411 dated Dec. 23, 2015.
Office Action issued in connection with U.S. Appl. No. 14/629,411 dated May 2, 2016.
Final Office Action issued in connection with U.S. Appl. No. 14/629,411 dated Sep. 26, 2016.
Office Action issued in connection with U.S. Appl. No. 14/629,411 dated Jan. 18, 2017.
Final Office Action issued in connection with U.S. Appl. No. 14/629,411 dated May 9, 2017.
Office Action issued in connection with U.S. Appl. No. 14/629,411 dated Sep. 8, 2017.
Notice of Allowance issued in connection with U.S. Appl. No. 14/629,411 dated Mar. 15, 2018.
Office Action issued in connection with U.S. Appl. No. 13/621,010 dated Jan. 10, 2013.
Final Office Action issued in connection with U.S. Appl. No. 13/621,010 dated May 21, 2013.
Office Action issued in connection with U.S. Appl. No. 13/621,010 dated Apr. 8, 2014.
Final Office Action issued in connection with U.S. Appl. No. 13/621,010 dated Oct. 10, 2014.
Office Action issued in connection with U.S. Appl. No. 13/621,010 dated Feb. 5, 2015.
Final Office Action issued in connection with U.S. Appl. No. 13/621,010 dated Jul. 10, 2015.
Office Action issued in connection with U.S. Appl. No. 13/621,010 dated Feb. 8, 2016.
Final Office Action issued in connection with U.S. Appl. No. 13/621,010 dated Jun. 2, 2016.
Notice of Allowance issued in connection with U.S. Appl. No. 13/621,010 dated Jul. 19, 2016.
Office Action issued in connection with U.S. Appl. No. 12/892,819 dated Oct. 11, 2012.
Final Office Action issued in connection with U.S. Appl. No. 12/892,819 dated Feb. 15, 2013.
Office Action issued in connection with U.S. Appl. No. 12/892,819 dated Apr. 15, 2014.
Final Office Action issued in connection with U.S. Appl. No. 12/892,819 dated Oct. 28, 2014.
Office Action issued in connection with U.S. Appl. No. 12/892,819 dated Feb. 18, 2015.
Final Office Action issued in connection with U.S. Appl. No. 12/892,819 dated Jul. 24, 2015.
Office Action issued in connection with U.S. Appl. No. 12/892,819 dated Mar. 18, 2016.
Final Office Action issued in connection with U.S. Appl. No. 12/892,819 dated Aug. 2, 2016.
Office Action issued in connection with U.S. Appl. No. 12/892,819 dated Dec. 22, 2016.
Final Office Action issued in connection with U.S. Appl. No. 12/892,819 dated Apr. 11, 2017.
Office Action issued in connection with U.S. Appl. No. 12/892,819 dated Aug. 10, 2017.
Final Office Action issued in connection with U.S. Appl. No. 12/892,819 dated Jan. 17, 2018.
Notice of Allowance issued in connection with U.S. Appl. No. 12/892,819 dated Jun. 1, 2018.
Office Action issued in connection with U.S. Appl. No. 13/620,979 dated Jan. 16, 2013.
Final Office Action issued in connection with U.S. Appl. No. 13/620,979 dated May 28, 2013.
Office Action issued in connection with U.S. Appl. No. 13/620,979 dated Feb. 11, 2014.
Final Office Action issued in connection with U.S. Appl. No. 13/620,979 dated Jul. 15, 2014.
Office Action issued in connection with U.S. Appl. No. 13/620,979 dated Nov. 13, 2014.
Final Office Action issued in connection with U.S. Appl. No. 13/620,979 dated Feb. 23, 2015.
Office Action issued in connection with U.S. Appl. No. 13/620,979 dated Dec. 23, 2015.
Final Office Action issued in connection with U.S. Appl. No. 13/620,979 dated Apr. 8, 2016.
Office Action issued in connection with U.S. Appl. No. 13/620,979 dated Jul. 28, 2016.
Final Office Action issued in connection with U.S. Appl. No. 13/620,979 dated Dec. 7, 2016.
Office Action issued in connection with U.S. Appl. No. 13/620,979 dated Mar. 20, 2017.
Notice of Allowance issued in connection with U.S. Appl. No. 13/620,979 dated Jun. 19, 2017.
Office Action issued in connection with U.S. Appl. No. 16/154,597 dated Sep. 19, 2019.

(56) References Cited

OTHER PUBLICATIONS

Office Action issued in connection with U.S. Appl. No. 12/892,852 dated Oct. 11, 2012.
Final Office Action issued in connection with U.S. Appl. No. 12/892,852 dated Feb. 21, 2013.
Office Action issued in connection with U.S. Appl. No. 12/892,852 dated Feb. 24, 2014.
Final Office Action issued in connection with U.S. Appl. No. 12/892,852 dated Aug. 8, 2014.
Office Action issued in connection with U.S. Appl. No. 12/892,852 dated Dec. 1, 2014.
Final Office Action issued in connection with U.S. Appl. No. 12/892,852 dated Mar. 20, 2015.
Office Action issued in connection with U.S. Appl. No. 12/892,852 dated Dec. 23, 2015.
Notice of Allowance issued in connection with U.S. Appl. No. 12/892,852 dated Apr. 11, 2016.
Office Action issued in connection with U.S. Appl. No. 13/621,022 dated Jan. 2, 2013.
Final Office Action issued in connection with U.S. Appl. No. 13/621,022 dated May 22, 2013.
Office Action issued in connection with U.S. Appl. No. 13/621,022 dated Feb. 12, 2014.
Final Office Action issued in connection with U.S. Appl. No. 13/621,022 dated Jul. 17, 2014.
Office Action issued in connection with U.S. Appl. No. 13/621,022 dated Nov. 14, 2014.
Final Office Action issued in connection with U.S. Appl. No. 13/621,022 dated Feb. 23, 2015.
Office Action issued in connection with U.S. Appl. No. 13/621,022 dated Dec. 15, 2015.
Final Office Action issued in connection with U.S. Appl. No. 13/621,022 dated Apr. 5, 2016.
Office Action issued in connection with U.S. Appl. No. 13/621,022 dated Aug. 25, 2016.
Final Office Action issued in connection with U.S. Appl. No. 13/621,022 dated Dec. 22, 2016.
Office Action issued in connection with U.S. Appl. No. 13/621,022 dated Mar. 24, 2017.
Final Office Action issued in connection with U.S. Appl. No. 13/621,022 dated Jul. 26, 2017.
Office Action issued in connection with U.S. Appl. No. 13/621,022 dated Dec. 18, 2017.
Notice of Allowance issued in connection with U.S. Appl. No. 13/621,022 dated May 17, 2018.
Office Action issued in connection with U.S. Appl. No. 15/191,240 dated Nov. 2, 2016.
Final Office Action issued in connection with U.S. Appl. No. 15/191,240 dated Apr. 3, 2017.
Office Action issued in connection with U.S. Appl. No. 15/191,240 dated Jul. 18, 2017.
Notice of Allowance issued in connection with U.S. Appl. No. 15/191,240 dated Nov. 7, 2017.
Office Action issued in connection with U.S. Appl. No. 15/908,576 dated Dec. 20, 2018.
Final Office Action issued in connection with U.S. Appl. No. 15/908,576 dated Jun. 13, 2019.
Final Office Action issued in connection with U.S. Appl. No. 15/908,576 dated Sep. 27, 2019.
Office Action issued in connection with U.S. Appl. No. 12/892,873 dated Aug. 21, 2012.
Final Office Action issued in connection with U.S. Appl. No. 12/892,873 dated Jan. 7, 2013.
Office Action issued in connection with U.S. Appl. No. 12/892,873 dated May 7, 2014.
Notice of Allowance issued in connection with U.S. Appl. No. 12/892,873 dated Sep. 12, 2014.
Office Action issued in connection with U.S. Appl. No. 14/550,889 dated Mar. 12, 2015.
Notice of Allowance issued in connection with U.S. Appl. No. 14/550,889 dated Jul. 17, 2015.
Office Action issued in connection with U.S. Appl. No. 12/892,861 dated Aug. 21, 2012.
Final Office Action issued in connection with U.S. Appl. No. 12/892,861 dated Jan. 4, 2013.
Office Action issued in connection with U.S. Appl. No. 12/892,681 dated May 7, 2014.
Notice of Allowance issued in connection with U.S. Appl. No. 12/892,681 dated Aug. 29, 2014.
Office Action issued in connection with U.S. Appl. No. 14/550,892 dated Apr. 27, 2015.
Final Office Action issued in connection with U.S. Appl. No. 14/550,892 dated Aug. 17, 2015.
Notice of Allowance issued in connection with U.S. Appl. No. 14/550,892 dated Oct. 15, 2015.
Office Action issued in connection with U.S. Appl. No. 12/892,889 dated Oct. 10, 2012.
Final Office Action issued in connection with U.S. Appl. No. 12/892,889 dated May 1, 2013.
Office Action issued in connection with U.S. Appl. No. 12/892,889 dated Jul. 3, 2014.
Notice of Allowance issued in connection with U.S. Appl. No. 12/892,889 dated Oct. 3, 2014.
Notice of Allowance issued in connection with U.S. Appl. No. 14/566,615 dated Jun. 19, 2015.
Office Action issued in connection with U.S. Appl. No. 12/892,880 dated Sep. 20, 2012.
Final Office Action issued in connection with U.S. Appl. No. 12/892,880 dated Apr. 5, 2013.
Notice of Allowance issued in connection with U.S. Appl. No. 12/892,880 dated Jul. 17, 2013.
Office Action issued in connection with U.S. Appl. No. 14/071,276 dated Aug. 25, 2014.
Final Office Action issued in connection with U.S. Appl. No. 14/071,276 dated Feb. 4, 2015.
Notice of Allowance issued in connection with U.S. Appl. No. 14/071,276 dated Apr. 2, 2015.
Office Action issued in connection with U.S. Appl. No. 14/807,726 dated Jan. 9, 2017.
Final Office Action issued in connection with U.S. Appl. No. 14/807,726 dated Apr. 24, 2017.
Notice of Allowance issued in connection with U.S. Appl. No. 114/807,726 dated Jun. 29, 2017.
Office Action issued in connection with U.S. Appl. No. 12/892,877 dated Nov. 6, 2012.
Final Office Action issued in connection with U.S. Appl. No. 12/892,877 dated Mar. 19, 2013.
Notice of Allowance issued in connection with U.S. Appl. No. 12/892,877 dated Jun. 2, 2014.
Office Action issued in connection with U.S. Appl. No. 14/467,774 dated Mar. 27, 2015.
Notice of Allowance issued in connection with U.S. Appl. No. 14/467,774 dated Jul. 23, 2015.
Office Action issued in connection with U.S. Appl. No. 14/871,941 dated Feb. 2, 2016.
Final Office Action issued in connection with U.S. Appl. No. 14/871,941 dated Jul. 21, 2016.
Office Action issued in connection with U.S. Appl. No. 14/871,941 dated Nov. 16, 2016.
Final Office Action issued in connection with U.S. Appl. No. 14/871,941 dated Apr. 11, 2017.
Notice of Allowance issued in connection with U.S. Appl. No. 14/871,941 dated Jun. 21, 2017.
Office Action issued in connection with U.S. Appl. No. 12/695,537 dated Mar. 30, 2012.
Final Office Action issued in connection with U.S. Appl. No. 12/695,537 dated Oct. 15, 2012.
Office Action issued in connection with U.S. Appl. No. 12/695,537 dated Jul. 8, 2014.
Office Action issued in connection with U.S. Appl. No. 12/695,537 dated Jan. 29, 2015.

(56) References Cited

OTHER PUBLICATIONS

Final Office Action issued in connection with U.S. Appl. No. 12/695,537 dated Aug. 14, 2015.
Office Action issued in connection with U.S. Appl. No. 12/695,537 dated Jan. 8, 2016.
Notice of Allowance issued in connection with U.S. Appl. No. 12/695,537 dated Jul. 18, 2016.
Office Action issued in connection with U.S. Appl. No. 15/351,074 dated Feb. 8, 2018.
Final Office Action issued in connection with U.S. Appl. No. 15/351,074 dated Aug. 28, 2018.
Office Action issued in connection with U.S. Appl. No. 15/351,074 dated Jan. 2, 2019.
Final Office Action issued in connection with U.S. Appl. No. 15/351,074 dated Jul. 11, 2019.
Notice of Allowance issued in connection with U.S. Appl. No. 15/351,074 dated Aug. 7, 2019.
Notice of Allowance issued in connection with U.S. Appl. No. 12/952,118 dated Feb. 4, 2013.
Office Action issued in connection with U.S. Appl. No. 13/873,040 dated Jul. 18, 2014.
Notice of Allowance issued in connection with U.S. Appl. No. 13/873,040 dated Dec. 1, 2014.
Office Action issued in connection with U.S. Appl. No. 14/629,433 dated Nov. 6, 2015.
Final Office Action issued in connection with U.S. Appl. No. 14/629,433 dated May 18, 2016.
Office Action issued in connection with U.S. Appl. No. 14/629,433 dated Oct. 7, 2016.
Final Office Action issued in connection with U.S. Appl. No. 14/629,433 dated May 19, 2017.
Notice of Allowance issued in connection with U.S. Appl. No. 14/629,433 dated Nov. 22, 2017.
Notice of Allowance issued in connection with U.S. Appl. No. 15/936,205 dated Oct. 9, 2018.
Office Action issued in connection with U.S. Appl. No. 16/267,128 dated Jul. 17, 2019.
Office Action issued in connection with U.S. Appl. No. 12/960,421 dated May 10, 2013.
Notice of Allowance issued in connection with U.S. Appl. No. 12/960,421 dated Sep. 3, 2013.
Office Action issued in connection with U.S. Appl. No. 12/960,402 dated Jun. 20, 2013.
Final Office Action issued in connection with U.S. Appl. No. 12/960,402 dated May 8, 2014.
Office Action issued in connection with U.S. Appl. No. 12/960,402 dated Oct. 23, 2014.
Final Office Action issued in connection with U.S. Appl. No. 12/960,402 dated May 19, 2015.
Office Action issued in connection with U.S. Appl. No. 12/960,402 dated Sep. 24, 2015.
Notice of Allowance issued in connection with U.S. Appl. No. 12/960,402 dated Mar. 22, 2016.
Office Action issued in connection with U.S. Appl. No. 11/771,679 dated Apr. 30, 2010.
Final Office Action issued in connection with U.S. Appl. No. 11/771,679 dated Sep. 1, 2010.
Notice of Allowance issued in connection with U.S. Appl. No. 11/771,679 dated Jan. 24, 2011.
Office Action issued in connection with U.S. Appl. No. 13/401,715 dated Jun. 26, 2013.
Final Office Action issued in connection with U.S. Appl. No. 13/401,715 dated Jan. 14, 2014.
Office Action issued in connection with U.S. Appl. No. 13/401,715 dated Jul. 18, 2014.
Final Office Action issued in connection with U.S. Appl. No. 13/401,715 dated Feb. 27, 2015.
Office Action issued in connection with U.S. Appl. No. 13/401,715 dated Jul. 8, 2015.
Final Office Action issued in connection with U.S. Appl. No. 13/401,715 dated Mar. 1, 2016.
Office Action issued in connection with U.S. Appl. No. 13/401,715 dated Jan. 27, 2017.
Final Office Action issued in connection with U.S. Appl. No. 13/401,715 dated Oct. 3, 2017.
Notice of Allowance issued in connection with U.S. Appl. No. 13/401,715 dated Mar. 16, 2018.
Office Action issued in connection with U.S. Appl. No. 14/556,647 dated Oct. 19, 2015.
Office Action issued in connection with U.S. Appl. No. 14/556,647 dated Mar. 18, 2016.
Final Office Action issued in connection with U.S. Appl. No. 14/556,647 dated Aug. 25, 2016.
Notice of Allowance issued in connection with U.S. Appl. No. 14/556,647 dated Dec. 16, 2016.
Office Action issued in connection with U.S. Appl. No. 13/437,274 dated Jun. 6, 2014.
Final Office Action issued in connection with U.S. Appl. No. 13/437,274 dated Jan. 2, 2015.
Office Action issued in connection with U.S. Appl. No. 13/437,274 dated Jul. 29, 2015.
Final Office Action issued in connection with U.S. Appl. No. 13/437,274 dated Feb. 1, 2016.
Office Action issued in connection with U.S. Appl. No. 13/437,274 dated Oct. 7, 2016.
Final Office Action issued in connection with U.S. Appl. No. 13/437,274 dated May 11, 2017.
Office Action issued in connection with U.S. Appl. No. 13/437,274 dated Dec. 14, 2017.
Final Office Action issued in connection with U.S. Appl. No. 13/437,274 dated Jul. 11, 2018.
Notice of Allowance issued in connection with U.S. Appl. No. 13/437,274 dated Dec. 12, 2019.
Office Action issued in connection with U.S. Appl. No. 13/493,839 dated Jan. 14, 2014.
Office Action issued in connection with U.S. Appl. No. 13/493,839 dated Jan. 15, 2015.
Notice of Allowance issued in connection with U.S. Appl. No. 13/493,839 dated May 8, 2015.
Office Action issued in connection with U.S. Appl. No. 14/800,540 dated May 23, 2017.
Office Action issued in connection with U.S. Appl. No. 14/800,540 dated Jan. 24, 2018.
Notice of Allowance issued in connection with U.S. Appl. No. 14/800,540 dated Oct. 10, 2018.
Office Action issued in connection with U.S. Appl. No. 16/203,405 dated Jul. 10, 2019.
Office Action issued in connection with U.S. Appl. No. 16/203,405 dated Jan. 30, 2020.
Office Action issued in connection with U.S. Appl. No. 13/623,845 dated May 22, 2015.
Final Office Action issued in connection with U.S. Appl. No. 13/623,845 dated Sep. 9, 2015.
Notice of Allowance issued in connection with U.S. Appl. No. 13/623,845 dated Jan. 11, 2016.
Office Action issued in connection with U.S. Appl. No. 15/138,071 dated Feb. 2, 2017.
Final Office Action issued in connection with U.S. Appl. No. 15/138,071 dated Sep. 9, 2015.
Notice of Allowance issued in connection with U.S. Appl. No. 15/138,071 dated Mar. 12, 2018.
Office Action issued in connection with U.S. Appl. No. 16/020,477 dated Jun. 17, 2019.
Final Office Action issued in connection with U.S. Appl. No. 16/020,477 dated Sep. 9, 2015.
Notice of Allowance issued in connection with U.S. Appl. No. 16/020,477 dated Sep. 11, 2019.
Office Action issued in connection with U.S. Appl. No. 13/623,847 dated Jun. 19, 2014.
Final Office Action issued in connection with U.S. Appl. No. 13/623,847 dated Jan. 28, 2015.

(56) References Cited

OTHER PUBLICATIONS

Notice of Allowance issued in connection with U.S. Appl. No. 13/623,847 dated May 22, 2015.
Office Action issued in connection with U.S. Appl. No. 13/528,674 dated Aug. 20, 2014.
Notice of Allowance issued in connection with U.S. Appl. No. 13/528,674 dated Mar. 20, 2015.
Office Action issued in connection with U.S. Appl. No. 13/528,664 dated Sep. 12, 2014.
Final Office Action issued in connection with U.S. Appl. No. 13/528,664 dated Mar. 26, 2015.
Notice of Allowance issued in connection with U.S. Appl. No. 13/528,664 dated Jul. 8, 2015.
Office Action issued in connection with U.S. Appl. No. 13/603,369 dated Jan. 22, 2015.
Office Action issued in connection with U.S. Appl. No. 13/603,369 dated Jun. 11, 2015.
Final Office Action issued in connection with U.S. Appl. No. 13/603,369 dated Nov. 17, 2015.
Notice of Allowance issued in connection with U.S. Appl. No. 13/603,369 dated Aug. 25, 2016.
Office Action issued in connection with U.S. Appl. No. 11/395,463 dated Sep. 8, 2010.
Office Action issued in connection with U.S. Appl. No. 11/395,463 dated Nov. 13, 2009.
Final Office Action issued in connection with U.S. Appl. No. 11/395,463 dated Dec. 29, 2010.
Office Action issued in connection with U.S. Appl. No. 11/395,463 dated Jul. 19, 2011.
Notice of Allowance issued in connection with U.S. Appl. No. 11/395,463 dated Nov. 1, 2011.
Office Action issued in connection with U.S. Appl. No. 14/091,272 dated Aug. 4, 2015.
Final Office Action issued in connection with U.S. Appl. No. 14/091,272 dated Feb. 17, 2016.
Final Office Action issued in connection with U.S. Appl. No. 14/091,272 dated Jun. 9, 2017.
Notice of Allowance issued in connection with U.S. Appl. No. 14/091,272 dated Sep. 26, 2018.
Notice of Allowance issued in connection with U.S. Appl. No. 16/271,211 dated Jan. 9, 2020.
Office Action issued in connection with U.S. Appl. No. 13/909,705 dated Jun. 25, 2015.
Notice of Allowance issued in connection with U.S. Appl. No. 13/909,705 dated Nov. 27, 2015.
Office Action issued in connection with U.S. Appl. No. 15/075,728 dated Aug. 2, 2017.
Notice of Allowance issued in connection with U.S. Appl. No. 15/075,728 dated Nov. 24, 2017.
Office Action issued in connection with U.S. Appl. No. 15/935,615 dated Aug. 23, 2018.
Notice of Allowance issued in connection with U.S. Appl. No. 15/935,615 dated Feb. 4, 2019.
Office Action issued in connection with U.S. Appl. No. 13/095,554 dated Sep. 4, 2012.
Final Office Action issued in connection with U.S. Appl. No. 13/095,554 dated Jun. 20, 2013.
Office Action issued in connection with U.S. Appl. No. 13/095,554 dated Oct. 7, 2014.
Final Office Action issued in connection with U.S. Appl. No. 13/095,554 dated Jun. 30, 2015.
Office Action issued in connection with U.S. Appl. No. 13/095,554 dated Nov. 12, 2015.
Final Office Action issued in connection with U.S. Appl. No. 13/095,554 dated May 19, 2016.
Office Action issued in connection with U.S. Appl. No. 13/095,554 dated May 18, 2017.
Final Office Action issued in connection with U.S. Appl. No. 13/095,554 dated Sep. 21, 2017.
Office Action issued in connection with U.S. Appl. No. 13/095,554 dated Mar. 9, 2018.
Final Office Action issued in connection with U.S. No. 13/095,554 dated Jun. 28, 2018.
Office Action issued in connection with U.S. Appl. No. 13/095,554 dated Oct. 5, 2018.
Office Action issued in connection with U.S. Appl. No. 16/261,401 dated Apr. 12, 2019.
Notice of Allowance issued in connection with U.S. Appl. No. 16/261,401 dated Jun. 28, 2019.
Office Action issued in connection with U.S. Appl. No. 14/575,798 dated Sep. 19, 2016.
Final Office Action issued in connection with U.S. Appl. No. 14/575,798 dated May 3, 2017.
Office Action issued in connection with U.S. Appl. No. 14/575,798 dated Aug. 23, 2017.
Notice of Allowance issued in connection with U.S. Appl. No. 14/575,798 dated Mar. 30, 2018.
Office Action issued in connection with U.S. Appl. No. 14/575,816 dated Sep. 22, 2016.
Final Office Action issued in connection with U.S. Appl. No. 14/575,816 dated May 3, 2017.
Office Action issued in connection with U.S. Appl. No. 14/575,816 dated Aug. 23, 2017.
Final Office Action issued in connection with U.S. Appl. No. 14/575,816 dated Mar. 22, 2018.
Notice of Allowance issued in connection with U.S. Appl. No. 14/575,816 dated May 30, 2018.
Office Action issued in connection with U.S. Appl. No. 16/154,580 dated Aug. 23, 2017.
Office Action issued in connection with U.S. Appl. No. 14/575,834 dated Sep. 30, 2016.
Final Office Action issued in connection with U.S. Appl. No. 14/575,834 dated Apr. 18, 2017.
Office Action issued in connection with U.S. Appl. No. 14/575,834 dated Nov. 9, 2017.
Notice of Allowance issued in connection with U.S. Appl. No. 14/575,834 dated May 17, 2018.
Office Action issued in connection with U.S. Appl. No. 14/666,205 dated May 10, 2017.
Final Office Action issued in connection with U.S. Appl. No. 14/666,205 dated Nov. 3, 2017.
Office Action issued in connection with U.S. Appl. No. 14/666,205 dated May 9, 2018.
Notice of Allowance issued in connection with U.S. Appl. No. 14/666,205 dated Oct. 29, 2018.
Office Action issued in connection with U.S. Appl. No. 14/673,305 dated Feb. 21, 2017.
Notice of Allowance issued in connection with U.S. Appl. No. 14/673,305 dated Jul. 19, 2017.
Office Action issued in connection with U.S. Appl. No. 15/811,437 dated Feb. 25, 2019.
Notice of Allowance issued in connection with U.S. Appl. No. 15/811,437 dated Jul. 16, 2019.
Office Action issued in connection with U.S. Appl. No. 14/673,121 dated Jan. 26, 2017.
Final Office Action issued in connection with U.S. Appl. No. 14/673,121 dated Jun. 1, 2017.
Notice of Allowance issued in connection with U.S. Appl. No. 14/673,121 dated Oct. 11, 2017.
Office Action issued in connection with U.S. Appl. No. 14/673,159 dated Feb. 13, 2017.
Final Office Action issued in connection with U.S. Appl. No. 14/673,159 dated Jun. 1, 2017.
Notice of Allowance issued in connection with U.S. Appl. No. 14/673,159 dated Oct. 4, 2017.
Office Action issued in connection with U.S. Appl. No. 14/711,502 dated Mar. 24, 2017.
Notice of Allowance issued in connection with U.S. Appl. No. 14/711,502 dated Aug. 1, 2017.
Office Action issued in connection with U.S. Appl. No. 15/788,657 dated Mar. 28, 2018.

(56) References Cited

OTHER PUBLICATIONS

Notice of Allowance issued in connection with U.S. Appl. No. 15/788,657 dated Sep. 20, 2018.
Office Action issued in connection with U.S. Appl. No. 16/232,421 dated Oct. 4, 2019.
Notice of Allowance issued in connection with U.S. Appl. No. 16/232,421 dated Feb. 10, 2020.
Office Action issued in connection with U.S. Appl. No. 12/652,541 dated Jan. 3, 2012.
Final Office Action issued in connection with U.S. Appl. No. 12/652,541 dated Sep. 5, 2012.
Notice of Allowance issued in connection with U.S. Appl. No. 12/652,541 dated Jan. 4, 2013.
Office Action issued in connection with U.S. Appl. No. 13/842,970 dated Apr. 30, 2014.
Final Office Action issued in connection with U.S. Appl. No. 13/842,970 dated Aug. 19, 2014.
Notice of Allowance issued in connection with U.S. Appl. No. 13/842,970 dated Dec. 5, 2014.
Notice of Allowance issued in connection with U.S. Appl. No. 14/644,031 dated Sep. 28, 2015.
Notice of Allowance issued in connection with U.S. Appl. No. 14/994,974 dated Sep. 27, 2017.
Notice of Allowance issued in connection with U.S. Appl. No. 15/844,371 dated Oct. 15, 2018.
Office Action issued in connection with U.S. Appl. No. 14/815,863 dated Jul. 13, 2017.
Notice of Allowance issued in connection with U.S. Appl. No. 14/815,863 dated Mar. 1, 2018.
Office Action issued in connection with U.S. Appl. No. 14/815,843 dated Mar. 20, 2018.
Office Action issued in connection with U.S. Appl. No. 14/864,684 dated Mar. 15, 2017.
Notice of Allowance issued in connection with U.S. Appl. No. 14/864,684 dated Jun. 22, 2017.
Office Action issued in connection with U.S. Appl. No. 14/864,638 dated Feb. 23, 2017.
Notice of Allowance issued in connection with U.S. Appl. No. 14/864,638 dated Jun. 8, 2017.
Office Action issued in connection with U.S. Appl. No. 15/714,993 dated Apr. 5, 2018.
Notice of Allowance issued in connection with U.S. Appl. No. 15/714,993 dated Jun. 8, 2017.
Office Action issued in connection with U.S. Appl. No. 14/864,683 dated Dec. 16, 2016.
Notice of Allowance issued in connection with U.S. Appl. No. 14/864,683 dated Apr. 25, 2017.
Office Action issued in connection with U.S. Appl. No. 14/975,157 dated Nov. 2, 2017.
Final Office Action issued in connection with U.S. Appl. No. 14/975,157 dated Jun. 15, 2018.
Notice of Allowance issued in connection with U.S. Appl. No. 14/975,157 dated Mar. 1, 2019.
Office Action issued in connection with U.S. Appl. No. 14/975,341 dated Nov. 29, 2017.
Final Office Action issued in connection with U.S. Appl. No. 14/975,341 dated Mar. 22, 2018.
Office Action issued in connection with U.S. Appl. No. 14/975,341 dated Feb. 21, 2019.
Office Action issued in connection with U.S. Appl. No. 14/937,762 dated Sep. 8, 2017.
Final Office Action issued in connection with U.S. Appl. No. 14/937,762 dated Apr. 18, 2018.
Notice of Allowance issued in connection with U.S. Appl. No. 14/937,762 dated Dec. 5, 2018.
Office Action issued in connection with U.S. Appl. No. 14/967,218 dated May 18, 2017.
Final Office Action issued in connection with U.S. Appl. No. 14/967,218 dated Nov. 29, 2017.
Notice of Allowance issued in connection with U.S. Appl. No. 14/967,218 dated Apr. 25, 2018.
Office Action issued in connection with U.S. Appl. No. 14/967,227 dated Dec. 21, 2017.
Final Office Action issued in connection with U.S. Appl. No. 14/967,227 dated Aug. 2, 2018.
Notice of Allowance issued in connection with U.S. Appl. No. 14/967,227 dated Nov. 28, 2018.
Notice of Allowance issued in connection with U.S. Appl. No. 15/174,913 dated May 18, 2018.
Office Action issued in connection with U.S. Appl. No. 16/126,437 dated Aug. 21, 2019.
Notice of Allowance issued in connection with U.S. Appl. No. 16/126,437 dated Jan. 23, 2020.
Notice of Allowance issued in connection with U.S. Appl. No. 15/197,438 dated Jun. 27, 2018.
Office Action issued in connection with U.S. Appl. No. 16/143,892 dated Jan. 29, 2020.
Notice of Allowance issued in connection with U.S. Appl. No. 15/245,089 dated Jan. 17, 2018.
Notice of Allowance issued in connection with U.S. Appl. No. 15/994,631 dated Aug. 22, 2019.
Notice of Allowance issued in connection with U.S. Appl. No. 15/245,847 dated Apr. 4, 2018.
Notice of Allowance issued in connection with U.S. Appl. No. 16/042,584 dated Jun. 17, 2019.
Office Action issued in connection with U.S. Appl. No. 15/389,276 dated Dec. 6, 2018.
Final Office Action issued in connection with U.S. Appl. No. 15/389,276 dated Jun. 13, 2019.
Notice of Allowance issued in connection with U.S. Appl. No. 15/389,276 dated Dec. 2, 2019.
Office Action issued in connection with U.S. Appl. No. 15/389,302 dated Sep. 26, 2018.
Final Office Action issued in connection with U.S. Appl. No. 15/389,302 dated Mar. 22, 2019.
Notice of Allowance issued in connection with U.S. Appl. No. 15/389,302 dated Aug. 6, 2019.
Office Action issued in connection with U.S. Appl. No. 15/389,314 dated Aug. 10, 2018.
Final Office Action issued in connection with U.S. Appl. No. 15/389,314 dated Feb. 6, 2019.
Notice of Allowance issued in connection with U.S. Appl. No. 15/389,314 dated Jul. 3, 2019.
Office Action issued in connection with U.S. Appl. No. 15/419,880 dated Aug. 8, 2019.
Final Office Action issued in connection with U.S. Appl. No. 15/419,880 dated Feb. 6, 2020.
Office Action issued in connection with U.S. Appl. No. 15/391,673 dated Nov. 21, 2018.
Final Office Action issued in connection with U.S. Appl. No. 15/391,673 dated Apr. 24, 2019.
Office Action issued in connection with U.S. Appl. No. 15/391,673 dated Sep. 10, 2019.
Final Office Action issued in connection with U.S. Appl. No. 15/391,673 dated Dec. 17, 2019.
Office Action issued in connection with U.S. Appl. No. 15/391,696 dated Jun. 20, 2018.
Final Office Action issued in connection with U.S. Appl. No. 15/391,696 dated Nov. 19, 2018.
Notice of Allowance issued in connection with U.S. Appl. No. 15/391,696 dated Mar. 26, 2019.
Notice of Allowance issued in connection with U.S. Appl. No. 15/627,132 dated Apr. 10, 2019.
Office Action issued in connection with U.S. Appl. No. 15/494,382 dated Jan. 8, 2019.
Notice of Allowance issued in connection with U.S. Appl. No. 15/494,382 dated Jul. 31, 2019.
Office Action issued in connection with U.S. Appl. No. 15/620,472 dated Mar. 21, 2019.
Final Office Action issued in connection with U.S. Appl. No. 15/620,472 dated Aug. 6, 2019.

(56) References Cited

OTHER PUBLICATIONS

Office Action issued in connection with U.S. Appl. No. 15/914,823 dated Jul. 15, 2019.
Notice of Allowance issued in connection with U.S. Appl. No. 15/914,823 dated Dec. 27, 2019.

* cited by examiner

HYBRID CONTENT REQUEST ROUTING SYSTEM

BACKGROUND

Generally described, computing devices and communication networks can be utilized to exchange information. In a common application, a computing device can request content from another computing device via the communication network. For example, a user at a personal computing device can utilize a browser application to request a content page (e.g., a network page, a Web page, etc.) from a server computing device via a network (e.g., the Internet). In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a content delivery network ("CDN") service provider. As with content providers, CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
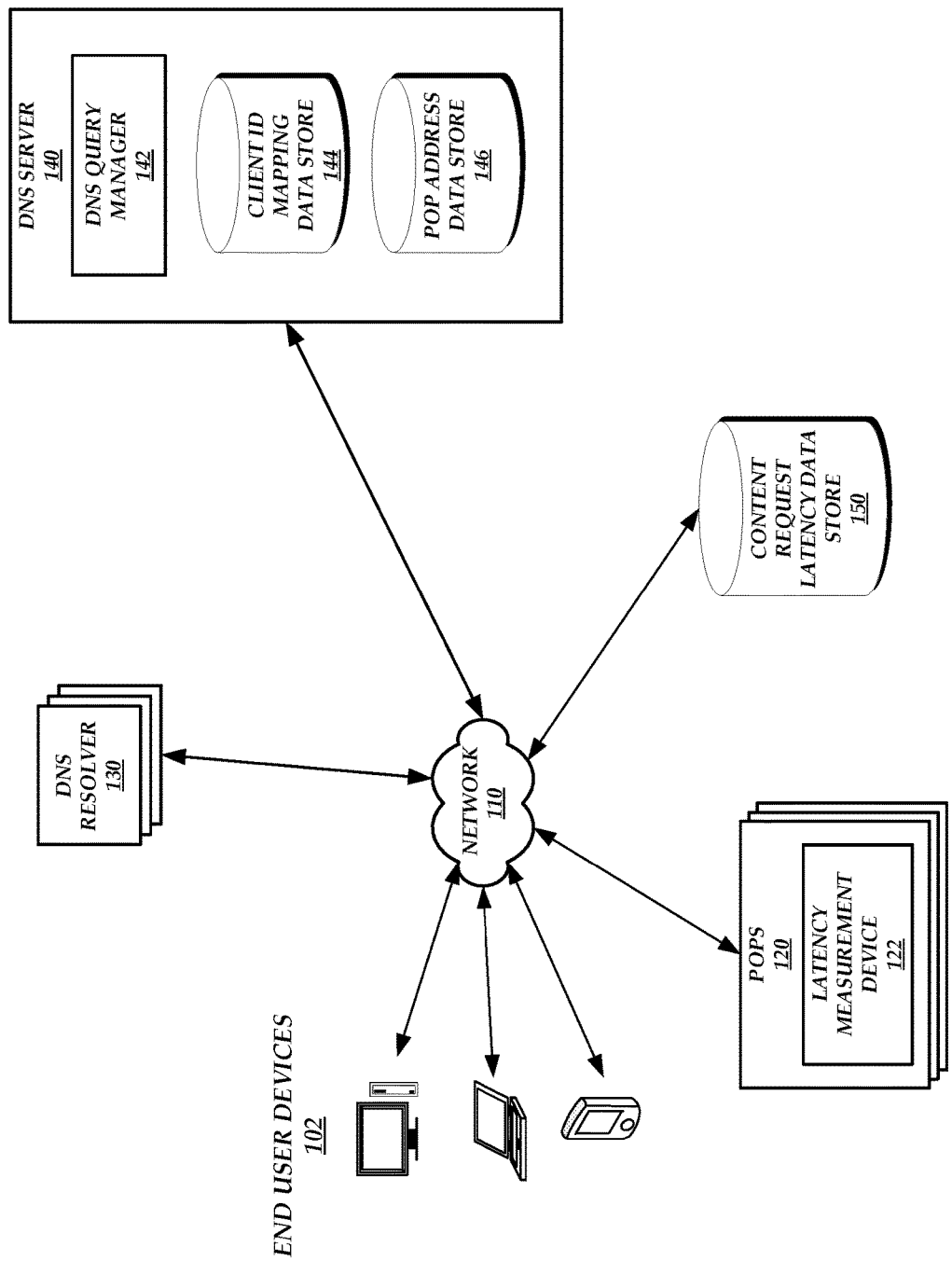
FIG. 1A is a block diagram of an illustrative operating environment in which one or more user devices communicate with one or more DNS resolvers via a network to receive network addresses for obtaining content.

As described above, content delivery network ("CDN") service providers often consider factors such as latency of delivery of requested content in order to meet service level agreements or to generally improve the quality of delivery service. Additionally, in embodiments in which computing devices utilize an Internet service provider ("ISP") to provide connectivity, the CDN service provider can consider additional factors associated with the interaction between the CDN service provider, the user devices, and ISP devices (e.g., domain name server (DNS) resolver components).

For example, a user operating a user device may provide a domain name to access a content page or to otherwise retrieve content provided by a CDN service provider. In order to identify a network address (e.g., Internet protocol (IP) address) corresponding to the domain name, the user device may submit a DNS query. A DNS query originating from a user device may be forwarded, relayed, and/or re-generated by one or more DNS resolvers present between the originating user device and a DNS service (e.g., a DNS server) authoritative for resolving the DNS query. Because the DNS service may receive the DNS query from a DNS resolver rather than directly from a user device, the DNS service may not have information corresponding to the user device from which the DNS query originated. In particular, the DNS service may not have the network address of the user device (e.g., a source network address of the DNS query), and thus may not have information identifying a location from where the DNS query originated.

In some cases, a CDN service provider may include multiple edge locations from which a user device can retrieve content. An edge location may be referred to herein as a point of presence (POP), where a POP is intended to refer to any collection of related computing devices utilized to implement functionality on behalf of one or many providers. POPs are generally associated with a specific geographic location in which the computing devices implementing the POP are located, or with a region serviced by the POP. For example, a data center or a collection of computing devices within a data center may form a POP. In some instances, the POPs may implement one or more services, such as CDN services, data storage services, data processing services, etc. A CDN service provider may include multiple POPs located in different geographic locations so that user devices can communicate with a nearby a POP to retrieve content, thereby reducing the latency of delivering requested content. However, without knowing the location of a user device from where a DNS query originates, the DNS service may not be able to determine accurately which POP network address to provide to a user device (via a DNS resolver) that would result in the lowest latency for delivering requested content.

One option for overcoming the lack of user device location information may be to implement an anycast routing technique. For example, a CDN service provider can assign some or all of the POPs the same anycast network address. Multiple routes from a source network address to the anycast network address may be announced through the border gateway protocol (BGP) networking protocol. While it may appear to a user device or routing device that the announced routes are all routes to the same computing device, the announced routes may in fact be routes to different POPs (e.g., to each POP assigned the anycast network address). Thus, the DNS service can return the anycast network address upon receiving a DNS query. When a user device attempts to retrieve content from the anycast network address, routing devices in the network may use the BGP networking protocol to identify a route to the nearest POP and forward the content request to the nearest POP using the identified route.

However, the nearest POP identified using the BGP networking protocol may not necessarily be the POP that can serve the requested content with the lowest latency. For example, the BGP networking protocol may identify the route to a POP that has the fewest number of hops. Routing devices along this route, though, may be congested or otherwise process data more slowly than other routing devices. Thus, a route that has a higher number of hops may actually result in a lower latency for delivering requested content.

Another option for overcoming the lack of user device location information may be to implement a DNS resolver-based routing technique. For example, a CDN service provider may identify user devices that use a first DNS resolver to submit DNS queries, measure the latency of content requests from these user devices to various POPs, and identify, on average, the POP that results in the lowest content request latency. The POP that, on average, results in the lowest content request latency can then be associated with the first DNS resolver. Thus, when the DNS service receives a request from the first DNS resolver, the DNS service can provide the network address of the associated POP that, on average, results in the lowest content request latency.

The above approach may be accurate in situations in which user devices that use a particular DNS resolver are located within a similar geographic location. However, in some cases, user devices that use the same DNS resolver are located in widely disparate geographic locations. As an illustrative example, a first user device that uses a DNS resolver may be in Europe and a second user device that uses a DNS resolver may be in Japan. The POP associated with the DNS resolver that, on average, results in the lowest content request latency may be located in the United States. Other POPs may exist in Europe and Japan, though, and so the POP selected for the Europe user device or the Japan user device (e.g., the United States POP) may not actually be the POP that results in the lowest latency.

Accordingly, a hybrid content request routing system is described herein. The hybrid content request routing system may use aspects of the anycast routing technique and aspects of the DNS resolver-based routing technique to identify the appropriate POP to serve content (e.g., the appropriate network address to provide to a user device in response to receiving a DNS query). For example, the hybrid content request routing system may include one or more POPs, one or more DNS resolvers, and one or more DNS servers. A set of POPs may be grouped together to form a virtual POP, where each POP in the virtual POP may be assigned an anycast network address. Thus, a request sent to the anycast network address may be routed to one of the POPs in the virtual POP. The hybrid content request routing system may have one or more virtual POPs. In addition, some or all of the POPs may be assigned an individual network address.

Initially, the hybrid content request routing system may implement techniques for determining which source network addresses use specific DNS resolvers. For example, when a user device transmits a content request in some situations, a unique ID generation system (e.g., a recon service) may receive the content request, generate a unique client identifier for the user device, and send the unique client identifier back to the user device. The unique client identifier may be included in a message that functions as a redirect, causing the user device to first transmit a DNS query to a DNS resolver so that a network address can be provided for retrieving the desired content. The DNS query may include the unique client identifier. The DNS resolver can forward the DNS query to a DNS server and the DNS server can map at least a portion of the unique client identifier (e.g., the portion that includes the source address of the user device) included in the DNS query to the DNS resolver that forwarded the DNS query. The DNS resolver can then resolve the DNS query and provide the user device with a network address via the DNS resolver.

The network address provided by the DNS server may be a network address of a POP or a network address of a virtual POP (e.g., an anycast network address). The user device may send a content request to the provided network address, and the POP that receives the content request (e.g., either a standalone POP or a POP that forms part of a virtual POP) can measure the request routing performance (e.g., the latency associated with the transmission of the content request) from the source address of the user device to the POP. The POP can then retrieve the requested content and provide the user device with the requested content.

The above process can be repeated for a plurality of user devices, DNS resolvers, POPs, and/or virtual POPs. Thus, the latencies from various user devices to various POPs and/or virtual POPs may be measured. Using the measured latencies, the DNS server can determine which network address to provide in response to a DNS query. For example, a DNS server can receive a DNS query from a user device via DNS resolver. The DNS server can retrieve the mappings of source addresses to DNS resolvers. Using these mappings, the DNS server can identify which source addresses use the DNS resolver from which the DNS query was received. The DNS server can then retrieve the measured latencies corresponding to the identified source addresses. Because each measured latency is associated with both a source address and a POP or virtual POP network address, the DNS server can determine, for each POP network address (e.g., individual network addresses and/or anycast network addresses), an average latency. The DNS server can then rank the individual and/or anycast network addresses by average latency and provide the user device, via the DNS resolver, with the highest ranked network address.

Thus, the hybrid content request routing system described herein takes advantage of both the benefits of the anycast routing technique and the benefits of the DNS resolver-based routing technique. If a virtual POP network address determined as a result of the anycast routing technique would result in a latency that is lower than a latency associated with an individual POP network address determined as a result of the DNS resolver-based routing technique, then the DNS server provides the user device with the virtual POP network address. Likewise, if an individual POP network address determined as a result of the DNS resolver-based routing technique would result in a latency that is lower than a latency associated with a virtual POP network address determined as a result of the anycast routing technique, then the DNS server provides the user device with the individual POP network address. Given that user device location information is missing and there therefore may be no straightforward mechanism for accurately comparing the performance of the two routing techniques, the techniques described herein for measuring latencies and comparing the performance of the two techniques allows the hybrid content request routing system to overcome difficulties that otherwise may be present in attempting to combine the benefits of the anycast routing technique and the DNS resolver-based routing technique. Accordingly, the present disclosure represents an improvement over existing network request routing systems and computing systems in general.

While the techniques described herein are disclosed as being performed by a DNS server, this is not meant to be limiting. For example, any system that selects a POP to serve content or receive content can implement the techniques described herein as being performed by a DNS server. Such a system may be referred to herein as a "POP selection system." Because the POP selection system may not necessarily be a DNS server, the POP selection system may generically receive a "POP selection query" instead of a DNS query. Furthermore, the POP selection system may receive the POP selection query from a user device or a POP selection resolver (e.g., a system that serves as an intermediary between a user device and the POP selection system) instead of from a DNS resolver. Examples of a POP selection system can include an intermediate system that receives or intercepts content requests from user devices, a POP load balancer, a system that receives data from user devices for remote storage, or any other system that can receive a message (e.g., a POP selection query) from a user device directly or indirectly via a POP selection resolver, select a POP for the user device to contact, and transmit a reply message for receipt by the user device that includes an instruction to contact the selected POP.

The foregoing aspects and many of the attendant advantages of this disclosure will become more readily appreciated as the same become better understood by reference to the following detailed description, when taken in conjunction with the accompanying drawings.

Example Hybrid Content Request Routing Environment

FIG. 1A is a block diagram of an illustrative operating environment 100 in which one or more user devices 102 communicate with one or more DNS resolvers 130 via a network 110 to receive network addresses for obtaining content. The operating environment 100 further includes a DNS server 140, one or more points of presence (POPs) 120, and a content request latency data store 150. While a single DNS server 140 is illustrated, this is merely for simplicity and is not meant to be limiting. For example, the operating environment 100 may include any number of DNS servers 140.

While the POPs 120, the DNS resolvers 130, the DNS server 140, and the content request latency data store 150 are illustrated as separate components, this is not meant to be limiting. Any one or all of these components may be associated with each other to form a CDN service provider, not shown. For example, any one or all of these components may implemented by a single computing device, or by multiple distinct computing devices, such as computer servers, logically or physically grouped together to collectively operate as a server system. Any one or all of these components may communicate via a shared network internal to the CDN service provider, not shown, and the CDN service provider may communicate with one or more of the user devices 102 via the network 110.

As used herein, a POP 120 is intended to refer to any collection of related computing devices utilized to implement functionality on behalf of one or many providers. POPs 120 are generally associated with a specific geographic location in which the computing devices implementing the respective POP 120 are located, or with a region serviced by the respective POP 120. For example, a data center or a collection of computing devices within a data center may form a POP 120. In some instances, the POPs 120 may implement one or more services, such as CDN services, data storage services, data processing services, etc. For the purposes of the present disclosure, the POPs 120 implement at least CDN services. The CDN services can include one or more servers communicatively coupled to a cache data store, not shown. The server(s) and cache data store may operate in conjunction to implement functionalities of the CDN services. For example, the server(s) and cache data store may operate to cache distributed content (e.g., as provided by the one or more origin servers) and respond to requests from end users (e.g., via user devices 102) for such cached content.

As described in greater detail below with respect to FIG. 1B, some or all of the POPs 120 may form a virtual POP. The virtual POP may be associated with an anycast network address. Thus, a request sent by a user device 102 to the anycast network address may be routed to one of the POPs 120 that forms the virtual POP. The operating environment 100 may include one or more virtual POPs.

Each POP 120 may include various modules, components, data stores, and/or the like to assist the DNS server 140 in resolving a DNS query. For example, each POP 120 may include a latency measurement device 122. The latency measurement device 122 may measure the latency of a content request submitted by a user device 102 and received by the respective POP 120. The latency measurement device 122 may measure the latency and store the latency in the content request latency data store 150 in an entry associated with the source network address of the user device 102 that submitted the content request and an identification of the POP 120 that received the content request.

The DNS resolvers 130 may be computing devices with hardware components (e.g., processor(s), memory, network interfaces, etc.) that submit DNS queries to the DNS server 140 on behalf of user devices 102. As described herein, individual user devices 102 may be associated with a particular DNS resolver 130 and thus may use the associated DNS resolver 130 to submit DNS queries to the DNS server 140. In one embodiment, some or all of the DNS resolvers 130 may be provided by individual enterprise networks to which individual user devices 102 belong. Thus, user devices 102 that belong to an enterprise network may use the DNS resolver 130 provided by that enterprise network to submit DNS queries to the DNS server 140. In another embodiment, some or all of the DNS resolvers 130 may be provided by individual Internet Service Providers (ISPs) that provide the communication network connection to individual user devices 102. Thus, user devices 102 that receive a communication network connection from an ISP may use the DNS resolver 130 provided by that ISP to submit DNS queries to the DNS server 140.

The DNS server 140 may determine the appropriate network address to retrieve and deliver in response to a received DNS query. The DNS server 140 may include various modules, components, data stores, and/or the like to provide the hybrid anycast routing/DNS resolver-based routing functionality described herein. For example, the DNS server 140 may include a DNS query manager 142, a client ID mapping data store 144, and a POP address data store 146. The DNS query manager 142 may map source network addresses to different DNS resolvers 130, average latencies stored in the content request latency data store 150, and use the mappings and average latencies to identify the appropriate network address to retrieve in response to a DNS query. Alternatively, the DNS query manager 142 can combine latencies stored in the content request latency data store 150 using another aggregation function, such as by taking a median latency stored in the content request latency data store 150, taking a mode latency stored in the content request latency data store 150, taking a minimum latency in the content request latency data store 150, taking a maximum latency in the content request latency data store 150, and/or the like, and use the mappings and combined latencies to identify the appropriate network address to retrieve in response to a DNS query. Additional details on the operations performed by the DNS query manager 142 are described in greater detail below with respect to FIGS. 2 and 5.

The client ID mapping data store 144 stores mappings of source network addresses to identifications of DNS resolvers 130. Thus, the client ID mapping data store 144 stores data indicating which source network addresses of user devices 102 use a particular DNS resolver 130 when DNS queries are submitted. While the client ID mapping data store 144 is depicted as being located internal to the DNS server 140, this is not meant to be limiting. For example, not shown, the client ID mapping data store 144 can be located external to the DNS server 140.

The POP address data store 146 stores the network addresses of one or more of the POPs 120 and the anycast network addresses of one or more virtual POPs. While the POP address data store 146 is depicted as being located internal to the DNS server 140, this is not meant to be limiting. For example, not shown, the POP address data store 146 can be located external to the DNS server 140.

The DNS server 140 may be a single computing device, or it may include multiple distinct computing devices, such as computer servers, logically or physically grouped together to collectively operate as a server system. The components of the DNS server 140 can each be implemented in application-specific hardware (e.g., a server computing device with one or more ASICs) such that no software is necessary, or as a combination of hardware and software. In addition, the modules and components of the DNS server 140 can be combined on one server computing device or separated individually or into groups on several server computing devices. In some embodiments, the DNS server 140 may include additional or fewer components than illustrated in FIG. 1A.

In some embodiments, the features and services provided by the POPs 120 and/or the DNS server 140 may be implemented as web services consumable via the communication network 110. In further embodiments, the POPs 120 and/or the DNS server 140 are provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The content request latency data store 150 stores, for a content request submitted by a particular user device 102 to a particular POP 120 or virtual POP, a latency associated with the submitted request. In particular, the stored latency may be a latency measured from a time that a user device 102 transmits a content request to a time that a POP 120 or virtual POP receives the transmitted content request. While the content request latency data store 150 is depicted as being located external to the POPs 120 and the DNS server 140, this is not meant to be limiting. For example, not shown, the content request latency data store 150 can be located internal to the POPs 120 and/or the DNS server 140.

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The user devices 102 may execute an application (e.g., a browser, a media player, etc.) that generates and transmits DNS queries to a DNS resolver 130 and that generates and transmits content requests to one or more POPs 120.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a semi-private or private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the public network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 1B:
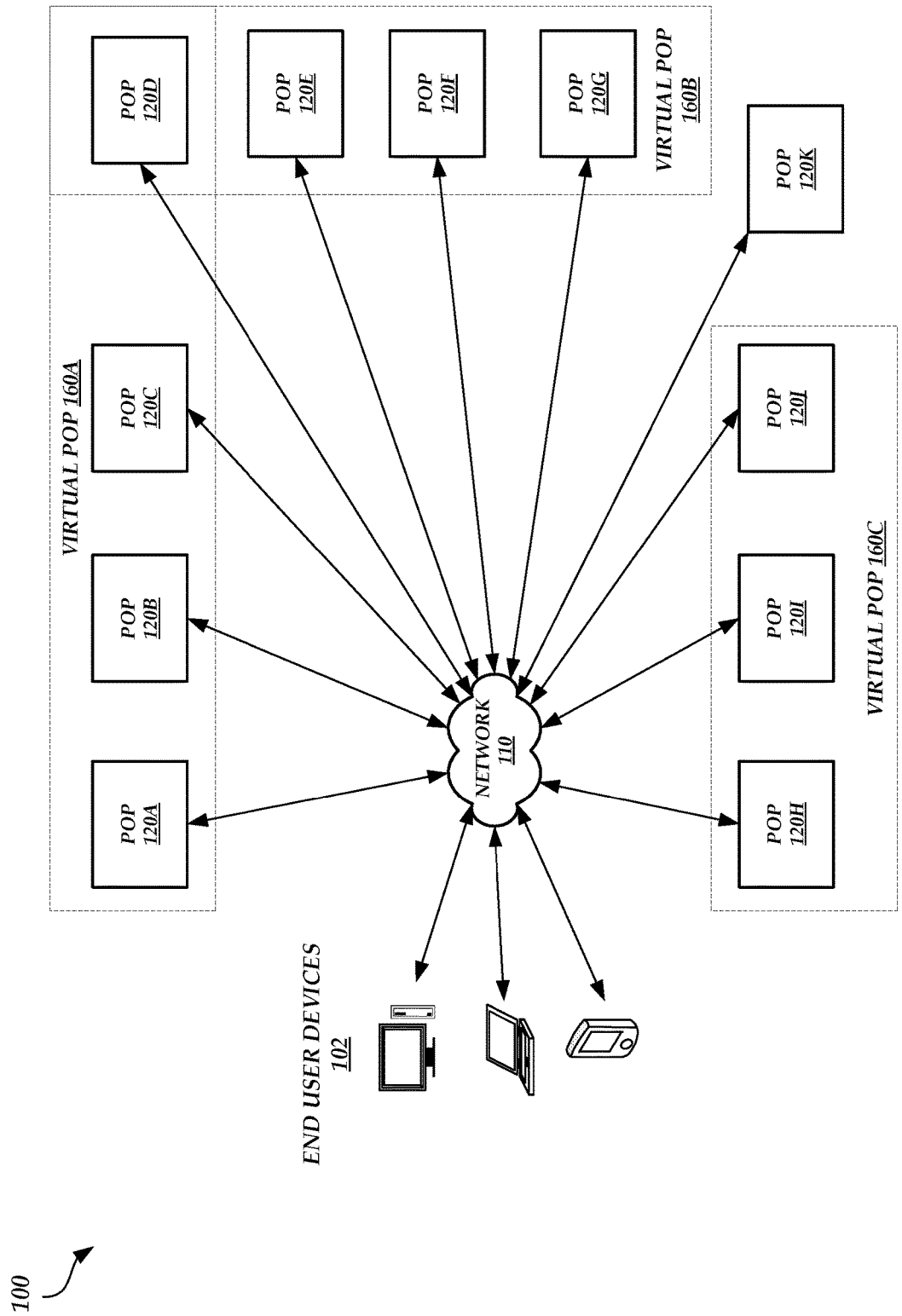
FIG. 1B is a block diagram of the illustrative operating environment of FIG. 1A in which virtual POPs are depicted.

FIG. 1B is a block diagram of the illustrative operating environment 100 of FIG. 1A in which virtual POPs 160A-C are depicted. While three virtual POPs 160A-C are depicted in FIG. 1B, this is merely for illustrative purposes and is not meant to be limiting. For example, any number of virtual POPs (e.g., one, two, three, four, five, etc.) may be present in the operating environment 100.

As illustrated in FIG. 1B, the virtual POP 160A is formed by four physical POPs 120A-D. Each POP 120A-D in the virtual POP 160A may be assigned the same anycast network address. If a user device 102 sends a request to the anycast network address assigned to the POPs 120A-D, the request may be routed to one of the POPs 120A-D according to the BGP routing protocol. For example, the BGP routing protocol may determine that the request will be routed to the POP 120A, 120B, 120C, or 120D that is the fewest number of hops away from the location of the user device 102 (e.g., as determined by the source network address of the user device 102). As used herein, a hop may occur when an intermediate routing device in the network 110 forwards the request to another routing device in the network 110 or the destination POP 120A-D.

Similar to the virtual POP 160A, the virtual POP 160B may be formed by four physical POPs 120D-120G and the virtual POP 160C may be formed by three physical POPs 120H-120J. Each POP 120D-G in the virtual POP 160B may be assigned the same anycast network address and each POP 120H-J in the virtual POP 160C may be assigned the same anycast network address. As illustrated in FIG. 1B, some POPs 120, such as POP 120D, may be part of two or more different virtual POPs. Thus, POPs 120 that are a part of two or more different virtual POPs may be assigned two or more corresponding anycast network addresses. As an illustrative example, the POP 120D may be assigned the same anycast network address as POPs 120A-C and may also be assigned the same anycast network address as POPs 120E-120G. Accordingly, the POPs 120A-D may share the same, first anycast network address, the POPs 120D-G may share the same, second anycast network address, and the POPs 120H-J may share the same, third anycast network address.

The POPs 120A-J that form a virtual POP 160A-C may be located in the same geographic region (e.g., the same city, state, country, continent, etc.). Alternatively, some or all of the POPs 120A-J that form a virtual POP 160A-C may be located in different geographic regions.

While each virtual POP 160A-C is depicted as being formed by three or four physical POPs, this is merely for illustrative purposes and is not meant to be limiting. Any virtual POP 160A-C may be formed from any number of physical POPs (e.g., one, two, three, four, five, etc.). For example, one virtual POP in the operating environment 100 may be formed from a large number of physical POPs (e.g., 20) and another virtual POP in the operating environment 100 may be formed from a small number of physical POPs (e.g., 2). Accordingly, a first virtual POP may not share any physical POPs with a second virtual POP. Alternatively, a first virtual POP may share some, but not all, of the physical POPs that form the first virtual POP with a second virtual POP. In another alternative, all of the physical POPs that form a first virtual POP may be a subset of all of the physical POPs that form a second virtual POP.

In addition to being assigned one or more anycast network addresses, one or more of the POPs 120A-J may be assigned a unique, individual network address. Thus, a request transmitted by the user device 102 to an individual network address may be routed to the POP 120A-J associated with the indicated individual network address. Moreover, any number of other POPs 120 that do not form any part of a virtual POP may be present in the operating environment 100. For example, the operating environment 100 may include POP 120K. The POP 120K may not form any part of a virtual POP. These POPs that do not form any part of a virtual POP, such as the POP 120K, may be assigned a unique, individual network address.

Example Block Diagrams for Resolving a DNS Query

Figure 2:
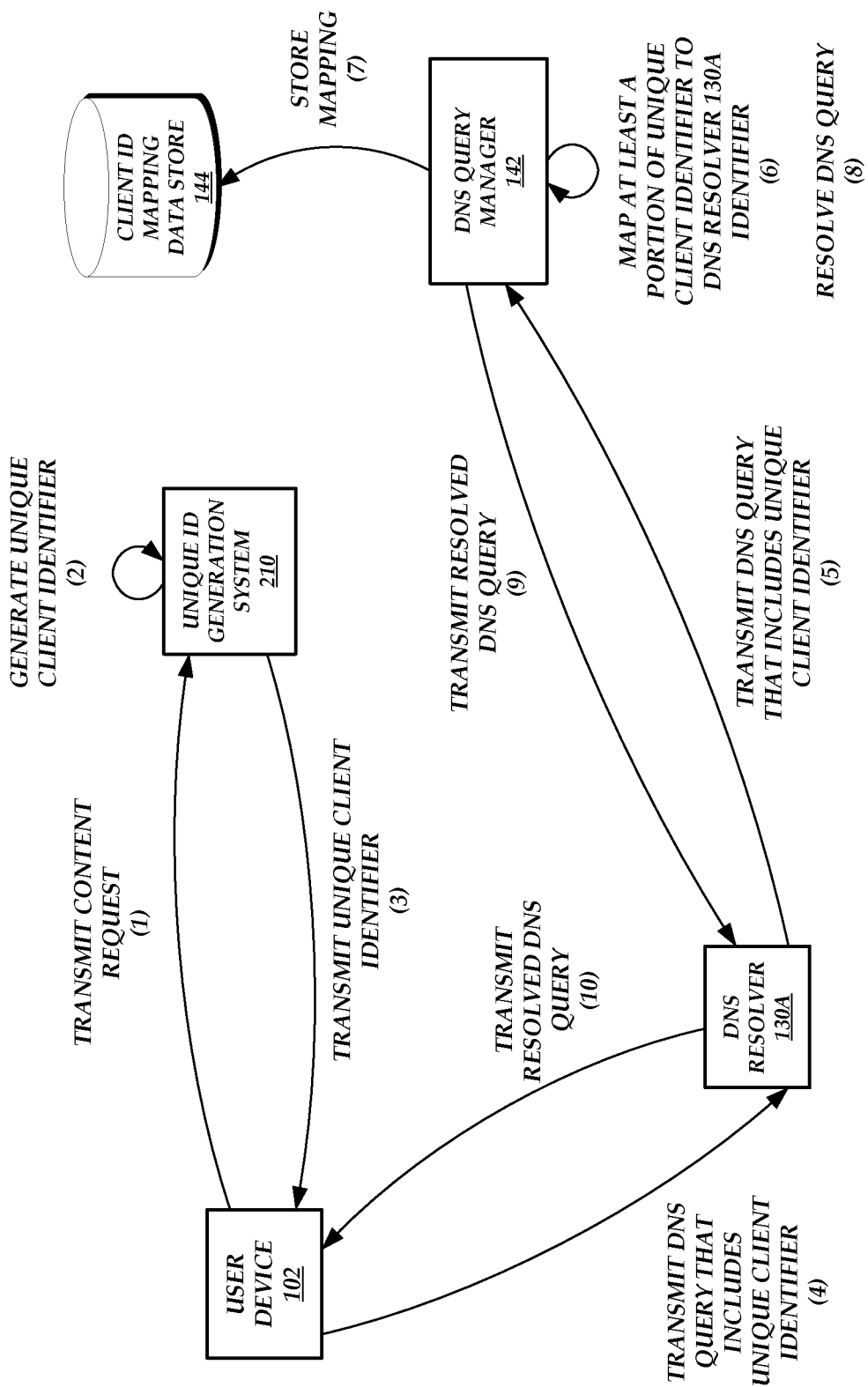
FIG. 2 is a block diagram of the operating environment of FIGS. 1A-1B illustrating the operations performed by the components of the operating environment to identify which user devices use the DNS resolver, according to one embodiment.

FIG. 2 is a block diagram of the operating environment 100 of FIGS. 1A-1B illustrating the operations performed by the components of the operating environment 100 to identify which user devices 102 use the DNS resolver 130A, according to one embodiment. As illustrated in FIG. 2, the user device 102 may transmit a content request to a unique ID generation system 210 (e.g., a recon service) at (1). The unique ID generation system 210 may be a POP 120 or a separate computing system. The user device 102 may be directed to the unique ID generation system 210 in an attempt to resolve a link previously provided to the user device 102.

Upon receipt of the content request, the unique ID generation system 210 may generate a unique client identifier at (2). The unique client identifier may be an identifier, such as a network address, that is used to track the requesting user device 102 in subsequent requests to a POP 120. Specifically, the unique client identifier may include at least a portion of the identifier associated with the requesting user device 102 (e.g., the source network address of the requesting user device 102, a media access control (MAC) address of the requesting user device 102, etc.). As an illustrative example, the unique client identifier generated by the unique ID generation system 210 may be in the form of a uniform resource locator (URL). For purposes of the illustrative example, the URL can identify a domain of the unique ID generation system 210 and/or a POP 120 (e.g., "serviceprovider.com"), an identification of the unique ID generation system 210 that generated the unique client identifier, and/or at least a portion of the identifier associated with the requesting user device 102. The URL can also include timestamp information associated with a time corresponding to the request (e.g., an absolute time or a time relative to another time, such as a time a content request is first received by the unique ID generation system 210) and/or additional processing information. In this illustrative example, the URL may be in the following form:

http://uniqueID.additional_information.IDgen_identification.serviceprovider.com Here, the label "uniqueID" can include at least a portion of the identifier associated with the requesting user device 102 (e.g., the source network address of the requesting user device 102). Alternatively or in addition, the label "uniqueID" may include timestamp information. The unique ID generation system 210 can then transmit the unique client identifier to the user device 102 at (3).

The unique client identifier may be a command (e.g., a redirect) that causes the user device 102 to request the content from another location. For example, the unique ID generation system 210 can generate a LOCATION command in accordance with the hypertext transfer protocol (HTTP) that identifies an alternate location for the requested content. Accordingly, the location included in the response sent by the unique ID generation system 210 to the user device 102 may be the unique client identifier, which may be in the form of a URL as depicted above.

The user device 102 can then process the unique client identifier, which causes the user device 102 to eventually request the content from an alternative location. For example, the user device 102 can transmit a DNS query that includes the unique client identifier to the DNS resolver 130A at (4) to request a network address of a POP corresponding to the location indicated by the unique client identifier. As an example, the URL representing the unique client identifier may include an identification of a DNS server authoritative to the "." and the "com" portions of the URL. The DNS resolver 130A can partially resolve the URL (e.g., resolve the "." and "com" portions of the URL) and, in response, submit a DNS query (not shown) for the resource URL that results in the identification of the authoritative DNS server, which is the DNS server corresponding to the ".serviceprovider" portion of the URL. Here, the DNS server 140 may be authoritative. Thus, the DNS resolver 130A can then forward the DNS query to the DNS query manager 142 of the DNS server 140 at (5) on behalf of the user device 102.

The DNS query manager 142 can then process the DNS query. For example, the DNS query manager 142 identifies an identifier associated with the DNS resolver 130A based on the received DNS query. The DNS query manager 142 also extracts at least a portion of the unique client identifier by parsing the unique client identifier. In particular, the DNS query manager 142 may extract the portion of the unique client identifier corresponding to the identifier associated with the requesting user device 102 (e.g., the "uniqueID," which may be the source network address of the requesting user device 102). The DNS query manager 142 can then map at least a portion of the unique client identifier to the DNS resolver 130A identifier at (6). For example, the DNS query manager 142 can map the identifier associated with the requesting user device 102 (e.g., the source network address of the requesting user device 102) to the DNS resolver 130A identifier. Thus, the DNS query manager 142 has determined that the requesting user device 102 (and therefore the corresponding source network address of the requesting user device 102) uses the DNS resolver 130A when submitting DNS queries. In addition, because source network addresses are generally associated with a geographic location, the DNS query manager 142 may also have determined the location of the requesting user device 102 and therefore a location of a user device 102 that uses the DNS resolver 130A. The DNS query manager 142 can then store the mapping in the client ID mapping data store 144 at (7).

The DNS query manager 142 can also resolve the DNS query at (8). For example, the DNS query manager 142 can retrieve a network address for a POP 120 that can provide requested content. The retrieved network address may be an individual network address of a POP 120 or an anycast network address corresponding to the POPs 120 that form a virtual POP. The DNS query manager 142 can then transmit the resolved DNS query to the DNS resolver 130A at (9), where the resolved DNS query includes the retrieved network address. The DNS resolver 130A can then transmit the resolved the DNS query to the user device 102 at (10). Additional details regarding the process for generating the unique client identifier and for using the unique client identifier to resolve a DNS query are described in U.S. Pat. No. 9,712,484, titled "MANAGING REQUEST ROUTING INFORMATION UTILIZING CLIENT IDENTIFIERS" and issued on Jul. 18, 2017, the entire contents of which are hereby incorporated herein by reference.

Figure 3A:
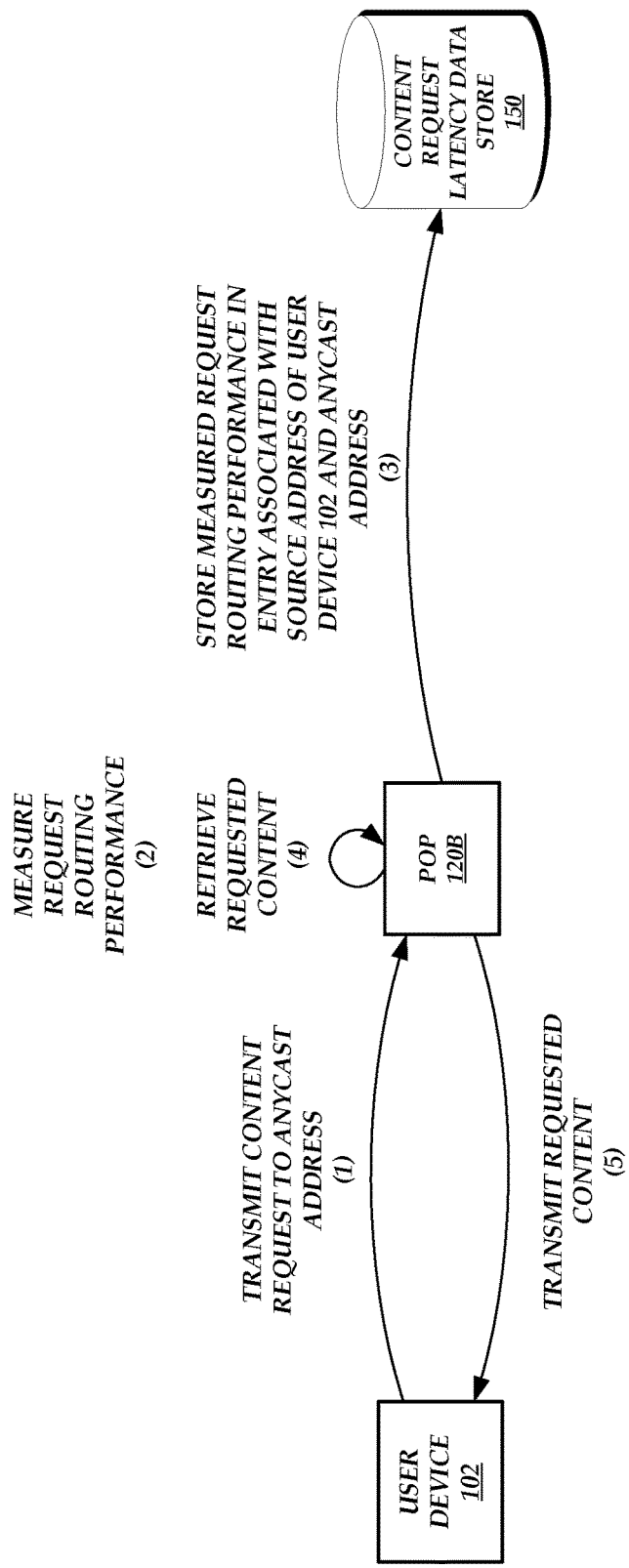
FIG. 3A is a block diagram of the operating environment of FIGS. 1A-1B illustrating the operations performed by the components of the operating environment in response to the resolved DNS query including an anycast network address, according to one embodiment.

FIG. 3A is a block diagram of the operating environment 100 of FIGS. 1A-1B illustrating the operations performed by the components of the operating environment 100 in response to the resolved DNS query including an anycast network address, according to one embodiment. As illustrated in FIG. 3A, after receiving the resolved DNS query (as depicted in FIG. 2), the user device 102 transmits a content request to the anycast network address included in the resolved DNS query at (1). The anycast network address may be associated with several POPs that form a virtual POP. For example, the anycast network address may be associated with the POPs 120A-D that form the virtual POP 160A. The BGP routing protocol may determine which POP 120A-D receives the content request. Here, the fewest number of hops between the user device 102 and a POP 120A-D of the virtual POP 160A may be between the user device 102 and the POP 120B. Thus, the user device 102 transmits the content request to the POP 120B.

The POP 120B (e.g., the latency measurement device 122) may measure the request routing performance at (2). For example, the latency measurement device 122 may measure the latency of the transmission of the content request from the user device 102 to the POP 120B. The content request may include a timestamp indicating a time when the user device 102 transmitted the content request. Thus, the latency measurement device 122 can compare a current time with the time indicated by the timestamp to determine the latency. The POP 120B can then store the measured request routing performance in the content request latency data store 150 at (3) in an entry associated with the source network address of the user device 102 and the anycast network address.

Before, during, or after measuring the request routing performance, the POP 120B can retrieve the requested content at (4). For example, the POP 120B may retrieve the requested content from a cache local to the POP 120B or from an origin server (not shown). The POP 120B can then transmit the requested content to the user device 102 at (5) to satisfy the content request.

Figure 3B:
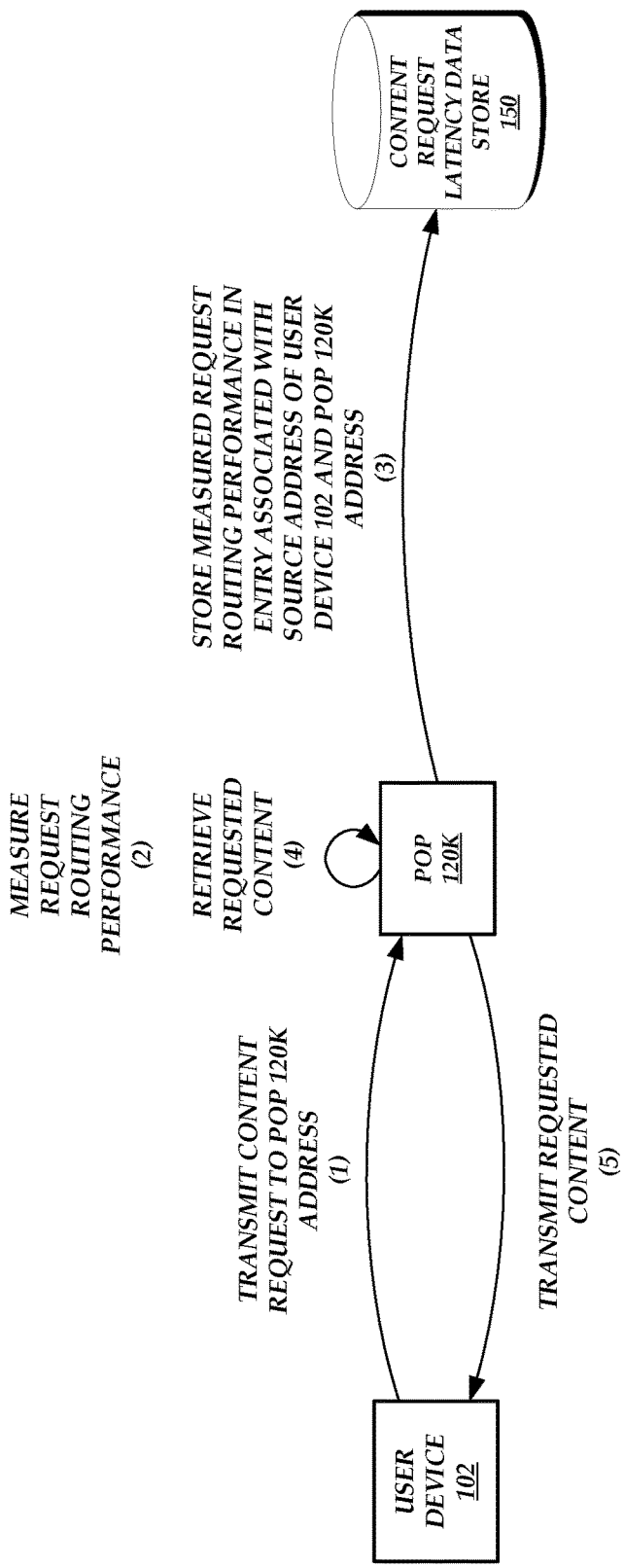
FIG. 3B is a block diagram of the operating environment of FIGS. 1A-1B illustrating the operations performed by the components of the operating environment in response to the resolved DNS query including an individual network address corresponding to a single POP, according to one embodiment.

FIG. 3B is a block diagram of the operating environment 100 of FIGS. 1A-1B illustrating the operations performed by the components of the operating environment 100 in response to the resolved DNS query including an individual network address corresponding to a single POP 120, according to one embodiment. As illustrated in FIG. 3B, after receiving the resolved DNS query (as depicted in FIG. 2), the user device 102 transmits a content request to the individual network address included in the resolved DNS query at (1). The individual network address may not be an anycast network address. Rather, the individual network address may be a unique network address associated with a POP. For example, the individual network address may be the network address of the POP 120K. Thus, the user device 102 transmits the content request to the POP 120K.

The POP 120K (e.g., the latency measurement device 122) may measure the request routing performance at (2). For example, the latency measurement device 122 may measure the latency of the transmission of the content request from the user device 102 to the POP 120K. The content request may include a timestamp indicating a time when the user device 102 transmitted the content request. Thus, the latency measurement device 122 can compare a current time with the time indicated by the timestamp to determine the latency. The POP 120K can then store the measured request routing performance in the content request latency data store 150 at (3) in an entry associated with the source network address of the user device 102 and the network address of the POP 120K.

Before, during, or after measuring the request routing performance, the POP 120K can retrieve the requested content at (4). For example, the POP 120K may retrieve the requested content from a cache local to the POP 120K or from an origin server (not shown). The POP 120K can then transmit the requested content to the user device 102 at (5) to satisfy the content request.

Some or all of the operations depicted in FIGS. 2 through 3B may be repeated over time for many different combinations of user devices 102, POPs 120, DNS resolvers 130, and/or DNS servers 140. Thus, the DNS query manager 142 may determine which source network addresses (e.g., user devices 102) use a particular DNS resolver and this information may then be stored in the client ID mapping data store 144. In addition, the content request latency data store 150 may therefore include latency measurements for different combinations of user devices 102 and POPs 120, such as latency measurements for content requests transmitted by user devices 102 to individual POP network addresses and latency measurements for content requests transmitted by user devices 102 to anycast POP network addresses.

Figure 4:
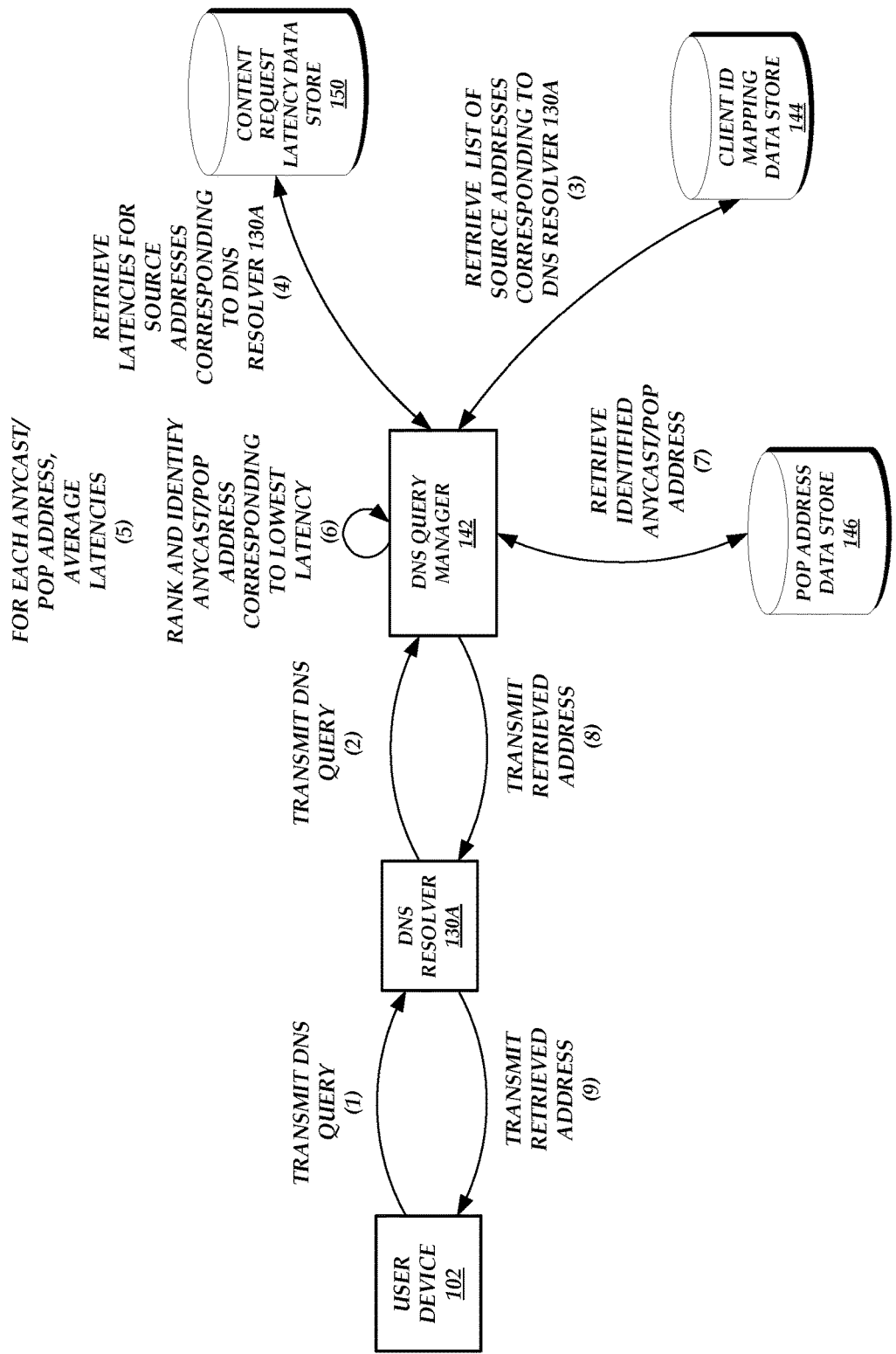
FIG. 4 is a block diagram of the operating environment of FIGS. 1A-1B illustrating the operations performed by the components of the operating environment to resolve a DNS query submitted by a user device, according to one embodiment.

FIG. 4 is a block diagram of the operating environment 100 of FIGS. 1A-1B illustrating the operations performed by the components of the operating environment 100 to resolve a DNS query submitted by a user device 102, according to one embodiment. As illustrated in FIG. 4, the user device 102 transmits a DNS query to an associated DNS resolver at (1). For example, the DNS resolver associated with the user device 102 may be the DNS resolver 130A. The DNS resolver 130A may then forward the DNS query to the DNS query manager 142 at (2).

The DNS query manager 142 may identify the DNS resolver that provided the DNS query using an identifier included in the DNS query. Thus, the DNS query manager 142 may determine that the DNS resolver 130A provided the DNS query. The DNS query manager 142 may then retrieve a list of source network addresses corresponding to the DNS resolver 130A from the client IP mapping data store 144 at (3). In other words, the DNS query manager 142 may query the client IP mapping data store 144 for the source network addresses that use the DNS resolver identified by the identifier in the DNS query (e.g., the DNS resolver 130A). Once the source network addresses that use the DNS resolver 130A are identified, the DNS query manager 142 can retrieve latencies for the identified source network addresses from the content request latency data store 150 at (4). Thus, the DNS query manager 142 may have some or all of the latencies that were measured for content requests submitted by the source network addresses that use the DNS resolver 130A.

As described herein, each latency may be associated with a source network address and a POP network address (e.g., either an anycast network address or an individual POP network address) corresponding to a POP 120 that measured the latency. Thus, the DNS query manager 142 can then, for each POP network address, average the latencies associated with the respective POP network address at (5). Alternatively, the DNS query manager 142 can, for each POP network address, combine the latencies associated with the respective POP network address using another aggregation function, such as by taking a median, a mode, a minimum, a maximum, and/or the like. Accordingly, the DNS query manager 142 may generate, for each individual POP network address and each anycast network address, an average latency value that represents the average latency of content requests submitted by source network addresses to the respective POP network address.

Alternatively, the DNS query manager 142 or another component in the operating environment 100 (not shown) can perform the latency averaging operations prior to the reception of a DNS query. The average latencies can be stored by the DNS query manager 142 or the other component in the content request latency data store 150 or another data store (not shown) for later retrieval when a DNS query is received.

The DNS query manager 142 can then rank the average latencies and, based on the ranking, identify the POP network address corresponding to the lowest latency at (6). For example, the DNS query manager 142 can rank the average latencies by average latency value. The highest ranked average latency value (e.g., the lowest average latency value) may be associated with an individual POP network address or an anycast network address. The associated POP network address may be the POP network address that the DNS query manager 142 provides to the user device 102 to resolve the DNS query. Optionally, the DNS query manager 142 may retrieve the POP network address that is associated with the highest ranked average latency value and/or corresponding information from the POP address data sore 146 at (7) (e.g., if the latency data retrieved from the content request latency data store 150 does not provide the entire POP network address or the information necessary to completely resolve the DNS query). The DNS query manager 142 can then transmit the retrieved POP network address to the DNS resolver 130A at (8), which then transmits the retrieved POP network address to the user device 102 at (9) to resolve the DNS query.

In some embodiments, the DNS query manager 142 does not transmit the POP network address associated with the highest ranked average latency value. For example, the DNS server 140 or another component in the operating environment 100 may monitor the load on individual POPs 120 and/or virtual POPs 160A-C. If the highest ranked average latency value corresponds with a POP network address for an individual POP 120 or a virtual POP 160 that is at request processing capacity or is nearly at request processing capacity (e.g., the POP is processing 90% of a total number of requests the POP is capable of processing), then the DNS query manager 142 may identify the next highest ranked average latency value that corresponds with a POP network address for an individual POP 120 or virtual POP 160 that is not at request processing capacity or that is not nearly at request processing capacity and provide this POP network address to resolve a DNS query. As another example, if the highest ranked average latency value corresponds with a POP network address for an individual POP 120 or a virtual POP 160 that has received a number of content requests over a threshold value during a set period of time, then the DNS query manager 142 can identify the next highest ranked average latency value that corresponds with a POP network address for an individual POP 120 or virtual POP 160 that has not received a number of content requests over the threshold value during the set period of time. The DNS query manager 142 may then transmit the POP network address associated with the next highest ranked average latency value if the next highest ranked average latency value is within a threshold value (e.g., 20 ms, 50 ms, 100 ms, etc.) of the highest ranked average latency value. If it turns out that the next highest ranked average latency value is not within a threshold value of the highest ranked average latency value, then the DNS query manager 142 can transmit the POP network address associated with the highest ranked average latency value despite the fact that the corresponding individual POP 120 or virtual POP 160 may have received a number of content requests over a threshold value during a set period of time. Thus, the DNS query manager 142 can still provide the POP network address associated with the highest ranked average latency value if there are substantial performance benefits over providing the POP network address associated with the next highest ranked average latency value that satisfies the conditions described above.

In some cases, it may be difficult to identify the exact load on the POPs 120 that form a virtual POP 160 because the BGP routing protocol ultimately determines which POP 120 receives the content request and this may be unknown to the DNS server 140 or other component. Thus, the DNS server 140 or other component can set a content request threshold for the virtual POP 160. If the DNS server 140 (e.g., DNS query manager 142) or other component determines that an anycast network address corresponding to a virtual POP 160 is associated with the highest ranked average latency value and determines that the number of content requests that are sent to this anycast network address in a given period of time exceeds a threshold value (e.g., the number of times the anycast network address is provided to resolve a DNS query in a given period of time exceeds a threshold value), then the DNS query manager 142 may temporarily stop responding to DNS queries with the anycast network address of the virtual POP 160. Rather, the DNS query manager 142 may identify the next highest ranked average latency value that corresponds with a POP network address for an individual POP 120 or virtual POP 160 that is not at request processing capacity, that is not nearly at request processing capacity, and/or that has not received a number of content requests that has exceeded a threshold value and provide this POP network address to resolve a DNS query.

Similarly, the DNS server 140 or other component may monitor the health of one or more POPs 120. For example, the DNS server 140 or other component can periodically transmit messages to the POPs 120 requesting an acknowledgement and/or the POPs 120 may periodically transmit beacon messages to the DNS server 140 or other component. If an individual POP 120 does not transmit an acknowledgement or beacon message for a threshold period of time, then the DNS server 140 or other component may determine that the POP 120 has malfunctioned, is offline, or is otherwise unavailable. If the highest ranked average latency value corresponds with a POP network address for an individual POP 120 that is unavailable, then the DNS query manager 142 may identify the next highest ranked average latency value that corresponds with a POP network address for an individual POP 120 that is available and provide this POP network address to resolve a DNS query. Likewise, if some or all of the POPs 120 that form a virtual POP 160 are unavailable and the DNS query manager 142 had otherwise determined that the highest ranked average latency value corresponds with the anycast network address corresponding to the virtual POP 160, then the DNS query manager 142 may identify the next highest ranked average latency value that corresponds with a POP network address for an individual POP 120 or virtual POP 160 that is available and provide this POP network address to resolve a DNS query.

Optionally, the DNS query manager 142 may select a POP network address that is not associated with the highest ranked average latency value and provide this POP network address to the user device 102 via the DNS resolver 130 so that the content request latency data store 150 includes an entry for a latency between the user device 102 and this POP network address.

In other embodiments, the DNS query manager 142 does not average and rank latencies for all of the POP network addresses. For example, a threshold number of latency values associated with a first POP network address may not be available. Thus, the DNS query manager 142 may not average the latency values associated with the first POP network address and therefore may not consider average latency values associated with the first POP network address in identifying the lowest average latency value. As another example, the DNS query manager 142 may not rank the average latencies. Rather, the DNS query manager 142 may simplify identify the lowest average latency value from a list of average latency values. As another example, the DNS query manager 142 may begin averaging latency values. Once the DNS query manager 142 identifies an average latency value that falls below a threshold value, then the DNS query manager 142 may select the associated POP network address as the POP network address to provide to the user device 102 to resolve the DNS query and can cease averaging any additional set of latency values.

Thus, even though the DNS server 140 is unaware of the user device 102 that submitted the DNS query, the DNS server 140 can nonetheless provide the user device 102 via the DNS resolver 130 with a POP network address that may reduce the latency associated with the delivery of requested content.

Example DNS Query Resolving Routine

Figure 5:
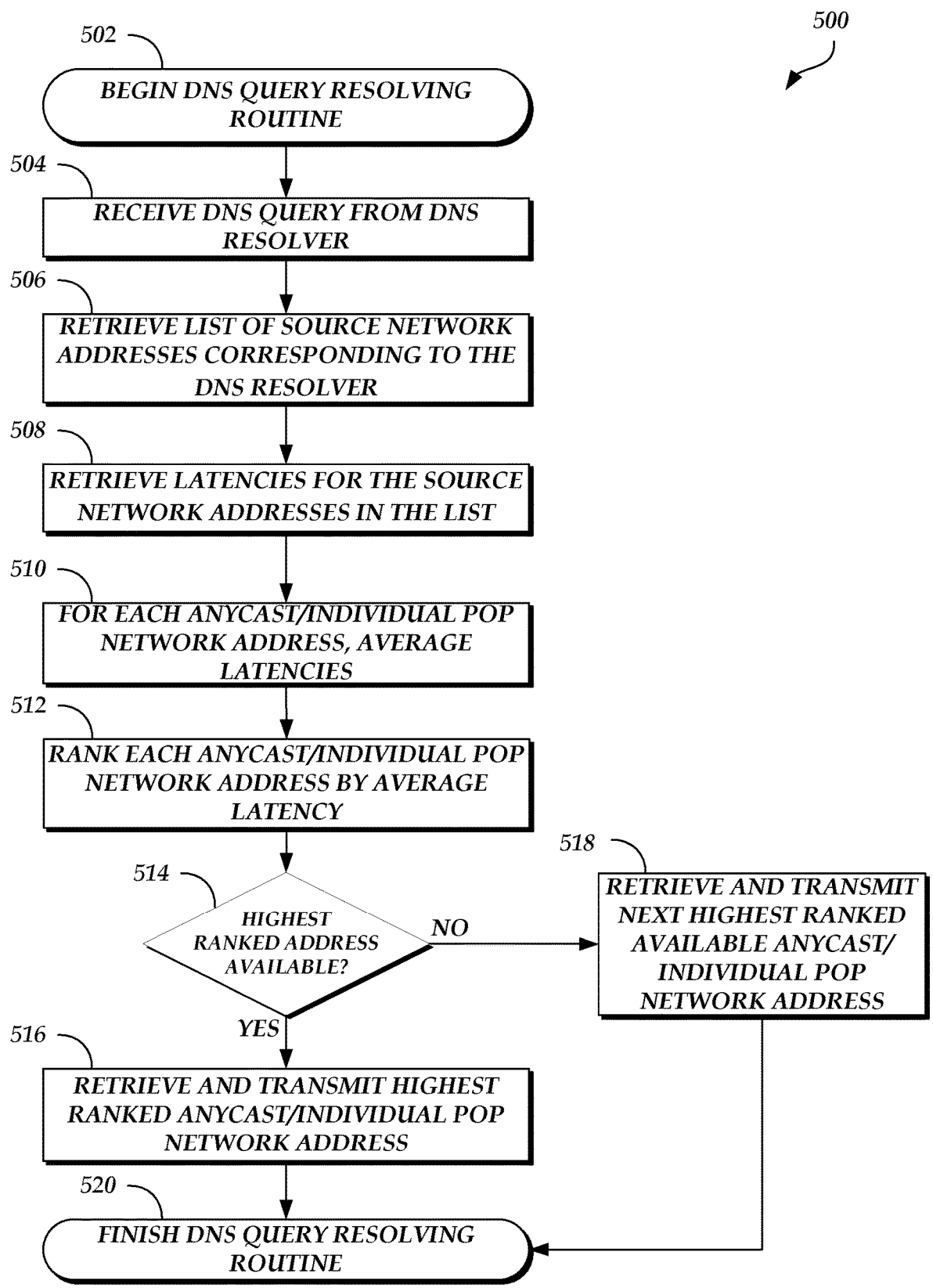
FIG. 5 is a flow diagram depicting a DNS query resolving routine illustratively implemented by a DNS server, according to one embodiment.

FIG. 5 is a flow diagram depicting a DNS query resolving routine 500 illustratively implemented by a DNS server, according to one embodiment. As an example, the DNS server 140 (e.g., the DNS query manager 142) of FIG. 1A can be configured to execute the DNS query resolving routine 500. The DNS query resolving routine 500 begins at block 502.

At block 504, a DNS query is received from a DNS resolver. The DNS query may include an identifier of the DNS resolver. However, the DNS query may not identify the user device 102 that initially transmitted the DNS query.

At block 506, a list of source network addresses corresponding to the DNS resolver is retrieved. For example, the list of source network addresses may include those source network addresses that have been determined to use the DNS resolver when submitting DNS queries.

At block 508, latencies for the source network addresses in the list are retrieved. For example, each retrieved latency may be associated with a source network address and a POP network address. The POP network address may be an individual POP network address or an anycast network address.

At block 510, for each anycast/individual POP network address, latencies are averaged. For example, latencies associated with a particular POP network address are aggregated and then averaged to determine an average latency value for the respective POP network address.

At block 512, each anycast/individual POP network address is ranked by average latency. For example, the anycast/individual POP network addresses may be ranked from lowest average latency value to highest average latency value.

At block 514, a determination is made as to whether the highest ranked POP network address is available. For example, a POP network address may not be available if the POP 120 or virtual POP 160 corresponding to the POP network address is at or nearly at request processing capacity, if the number of content requests transmitted to the virtual POP corresponding to the POP network address in a given period of time exceeds a threshold value (e.g., the number of times the POP network address is provided to resolve a DNS query in a given period of time exceeds a threshold value), and/or if the POP 120 or POPs 120 that form a virtual POP 160 corresponding to the POP network address are malfunctioning or offline. If the highest ranked POP network address is available, then the DNS query resolving routine 500 proceeds to block 516. Otherwise, if the highest ranked POP network address is unavailable, then the DNS query resolving routine 500 proceeds to block 518.

At block 516, the highest ranked anycast/individual POP network address is retrieved and transmitted. For example, the highest ranked anycast/individual POP network address may be transmitted to a DNS resolver 130, which then transmits the highest ranked anycast/individual POP network address to a user device 102 to resolve a DNS query. After retrieving and transmitting the highest ranked anycast/individual POP network address, the DNS query resolving routine 500 ends, as shown at block 520.

At block 518, the next highest ranked available anycast/individual POP network address is retrieved and transmitted. For example, the DNS query resolving routine 500 may repeat block 514, where the anycast/individual POP network addresses are analyzed in ranked order until an anycast/ individual POP network address is identified as being available to determine the next highest ranked available anycast/individual POP network address. The next highest ranked available anycast/individual POP network address may be transmitted to a DNS resolver 130, which then transmits the next highest ranked available anycast/individual POP network address to a user device 102 to resolve a DNS query. After retrieving and transmitting the next highest ranked available anycast/individual POP network address, the DNS query resolving routine 500 ends, as shown at block 520.

Additional Embodiments

As described herein, the latency measurement device 122 can measure and store latencies when a user device 102 actively transmits a content request. The latency measurement device 122 may measure and store the latencies each time a user device 102 transmits a content request so that the content request latency data store 150 includes as many entries as possible, which may improve the accuracy of the DNS server 140 DNS query resolving process. For example, the latency measurement device 122 may measure and store the latencies after the operations depicted in FIG. 2 are performed and/or after the operations depicted in FIG. 4 are performed. In other words, the operations depicted in FIGS. 3A and/or 3B can be performed after the operations depicted in FIG. 2 are performed and/or after the operations depicted in FIG. 4 are performed.

In some cases, the POP 120 or DNS server 140 may instruct the user device 102 to transmit a random content request in addition to the request for content desired by the user device 102. For example, upon receiving a content request from a user device 102, the POP 120 may return the requested content and provide an instruction to transmit in the background another content request to another POP 120, such as a POP 120 that is otherwise not the POP 120 that would provide the lowest content delivery latency. The other POP 120 can receive the content request and measure the latency. The other POP 120 may or may not respond to the content request (e.g., since the user device 102 does not need or desire the requested content). As another example, upon receiving a DNS query, the DNS server 140 (e.g., the DNS query manager 142) may return the network addresses of two or more POPs 120 and/or virtual POPs 160. One of the POPs 120 or virtual POPs 160 may provide the content requested by the user device 102. However, all of the POPs 120 and/or virtual POPs 160 referenced by the network addresses included in the resolved DNS query may measure the latency of requests submitted by the user device 102. Thus, these operations can be used to further increase the number of entries stored in the content request latency data store 150.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of resolving a domain name server (DNS) query, the method comprising:
   obtaining a first DNS query from a DNS resolver;
   obtaining a first source network address and a second source network address that use the DNS resolver to submit DNS queries;
   obtaining a first set of latency values that includes a measured latency between a first user device corresponding to the first source network address and a first point of presence (POP) that has a unique network address and a measured latency between the first user device and a second POP that has an anycast network address, and a second set of latency values that includes a measured latency between a second user device corresponding to the second source network address and the first POP and a measured latency between the second user device and the second POP;
   combining latency values in the first set of latency values and in the second set of latency values that correspond to the unique network address;
   combining latency values in the first set of latency values and in the second set of latency values that correspond to the anycast network address;
   determining that the unique network address corresponds to a lower combined latency value than the anycast network address; and
   transmitting the unique network address to the DNS resolver to resolve the first DNS query.

2. The computer-implemented method of claim 1, further comprising:
   obtaining a second DNS query from the DNS resolver, wherein the second DNS query comprises a unique client identifier;
   determining that the unique client identifier comprises the first source network address; and
   mapping the first source network address to the DNS resolver.

3. The computer-implemented method of claim 1, wherein the first set of latency values comprises first latency values that each correspond with a latency of a content request submitted by the first user device with the first source network address to one POP of a plurality of POPs that comprises the first POP.

4. The computer-implemented method of claim 1, wherein the first user device with the first source network address is configured to generate and transmit the first DNS query to the DNS resolver, wherein the first user device is further configured to obtain the unique network address from the DNS resolver, and wherein the first user device is further configured to transmit a content request to the unique network address.

5. The computer-implemented method of claim 1, wherein transmitting the unique network address to the DNS resolver further comprises:
   determining that the first POP is available; and
   transmitting the unique network address to the DNS resolver in response to the determination that the first POP is available.

6. A system comprising:
   a content request latency data store that stores a plurality of latency values; and
   a point of presence (POP) selection system comprising a processor configured with specific computer-executable instructions that, when executed, cause the POP selection system to at least:
      obtain a first POP selection query from a POP selection resolver;
      identify that a first source network address and a second source network address is mapped to the POP selection resolver;
      obtain a first latency value that includes a measured latency between a first user device corresponding to the first source network address and a first POP that has a unique network address from the content request latency data store, a second latency value that includes a measured latency between the first user device and a second POP that has an anycast network address, a third latency value that includes a measured latency between a second user device corresponding to the second source network address and the first POP, and a fourth latency value that includes a measured latency between the second user device and the second POP;

determine a first combined latency value for the unique network address using the first latency value and the third latency value;

determine a second combined latency value for the anycast network address using the second latency value and the fourth latency value;

determine that the first combined latency value is lower than the second combined latency value; and resolve the first POP selection query based on the determination that the first combined latency value is lower than the second combined latency value.

7. The system of claim 6, wherein the processor is further configured with specific computer-executable instructions that, when executed, cause the POP selection system to at least:

determine that the first POP is available; and transmit the unique network address to the POP selection resolver to resolve the first POP selection query.

8. The system of claim 6, wherein the processor is further configured with specific computer-executable instructions that, when executed, cause the POP selection system to at least:

determine that the first POP is unavailable; and transmit the anycast network address instead of the unique network address to the POP selection resolver to resolve the first POP selection query.

9. The system of claim 8, wherein the processor is further configured with specific computer-executable instructions that, when executed, cause the POP selection system to at least determine that the first POP is one of malfunctioning, offline, or currently at request processing capacity.

10. The system of claim 6, wherein the first combined latency value is one of an average of the first latency value and the third latency value, a median of the first latency value and the third latency value, a mode of the first latency value and the third latency value, a minimum of the first latency value and the third latency value, or a maximum of the first latency value and the third latency value.

11. The system of claim 6, wherein the processor is further configured with specific computer-executable instructions that, when executed, cause the POP selection system to at least:

obtain a second POP selection query from the POP selection resolver, wherein the second POP selection query comprises a unique client identifier;

determine that the unique client identifier comprises the first source network address;

map the first source network address to the POP selection resolver; and store the mapping of the first source network address to the POP selection resolver in a client ID mapping data store.

12. The system of claim 6, further comprising a third POP, wherein the second POP and the third POP are both assigned the anycast network address.

13. The system of claim 12, wherein the second POP is configured to at least:

obtain a content request from the first user device with the first source network address;

measure a latency of a transmission of the content request from the first user device to the second POP; and store the measured latency in the content request latency data store in an entry associated with the first source network address and the anycast network address.

14. The system of claim 13, wherein the third POP is configured to at least:

obtain a second content request from the second user device with the second source network address;

measure a second latency of a transmission of the second content request from the second user device to the third POP; and store the measured second latency in the content request latency data store in an entry associated with the second source network address and the anycast network address.

15. The system of claim 13, wherein the content request is routed from the first user device to the second POP according to a border gateway protocol (BGP) routing protocol.

16. The system of claim 6, wherein the POP selection system comprises a domain name server (DNS).

17. Non-transitory, computer-readable storage media comprising computer-executable instructions for resolving a point of presence (POP) selection query, wherein the computer-executable instructions, when executed by a computer system, cause the computer system to at least:

process a first POP selection query obtained from a POP selection resolver;

determine that a first source network address and a second source network address are mapped to the POP selection resolver;

obtain a first latency value that includes a measured latency between a first user device corresponding to the first source network address and a first POP that has a unique network address, a second latency value that includes a measured latency between the first user device and a second POP that has an anycast network address, a third latency value that includes a measured latency between a second user device corresponding to the second source network address and the first POP, and a fourth latency value that includes a measured latency between the second user device and the second POP;

determine that a combination of the first latency value and the third latency value is lower than a combination of the second latency value and the fourth latency value; and resolve the first POP selection query based on the determination that the combination of the first latency value and the third latency value is lower than the combination of the second latency value and the fourth latency value.

18. The non-transitory, computer-readable storage media of claim 17, wherein the computer-executable instructions further cause the computer system to at least:

determine that the first POP is available; and transmit the unique network address to the POP selection resolver to resolve the first POP selection query.

19. The non-transitory, computer-readable storage media of claim 17, wherein the computer-executable instructions further cause the computer system to at least:

determine that the first POP is unavailable; and transmit the anycast network address instead of the unique network address to the POP selection resolver to resolve the first POP selection query.

20. The non-transitory, computer-readable storage media of claim 17, wherein the computer-executable instructions further cause the computer system to at least:

process a second POP selection query obtained from the POP selection resolver, wherein the second POP selection query comprises a unique client identifier;

determine that the unique client identifier comprises the first source network address; and map the first source network address to the POP selection resolver.

\* \* \* \* \*